(12) United States Patent
Kellicker

(10) Patent No.: US 10,116,537 B2
(45) Date of Patent: Oct. 30, 2018

(54) MEDIA PLAYER ANALYTICS

(71) Applicant: WOWZA MEDIA SYSTEMS, LLC, Golden, CO (US)

(72) Inventor: Scott Kellicker, Worthington, OH (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 15/057,033

(22) Filed: Feb. 29, 2016

(65) Prior Publication Data

US 2017/0250882 A1    Aug. 31, 2017

(51) Int. Cl.
*H04L 12/26* (2006.01)
*H04L 29/06* (2006.01)
*H04L 29/08* (2006.01)

(52) U.S. Cl.
CPC .............. *H04L 43/08* (2013.01); *H04L 43/04* (2013.01); *H04L 43/12* (2013.01); *H04L 65/4084* (2013.01); *H04L 65/607* (2013.01); *H04L 67/16* (2013.01); *H04L 67/18* (2013.01); *H04L 67/42* (2013.01)

(58) Field of Classification Search
CPC ... G06F 17/30899; H04L 51/18; H04L 43/08; H04L 43/12; H04L 43/04; H04L 65/607; H04L 65/4084; H04L 67/16; H04L 67/18; H04L 67/42; H04N 21/44204; H04N 21/44222; H04N 21/6582
See application file for complete search history.

(56) References Cited

U.S. PATENT DOCUMENTS

| | | |
|---|---|---|
| 5,953,506 A | 9/1999 | Kalra et al. |
| 6,415,326 B1 | 7/2002 | Gupta et al. |
| 8,762,302 B1 | 6/2014 | Spivack et al. |
| 9,369,740 B1 * | 6/2016 | Funk ................. H04N 21/20 |
| 9,654,360 B1 | 5/2017 | Kellicker |
| 2003/0041110 A1 | 2/2003 | Wenocur et al. |
| 2008/0199155 A1 | 8/2008 | Hagens et al. |
| 2009/0138447 A1 | 5/2009 | Kalavade |
| 2010/0161580 A1 | 6/2010 | Chipman et al. |
| 2010/0235494 A1 * | 9/2010 | Sood ................. H04L 67/22 709/224 |
| 2010/0235741 A1 * | 9/2010 | Newman ............. G06F 9/542 715/716 |
| 2011/0029665 A1 | 2/2011 | Wenig et al. |
| 2011/0040760 A1 | 2/2011 | Fleischman et al. |
| 2011/0161409 A1 | 6/2011 | Nair et al. |
| 2011/0167148 A1 | 7/2011 | Bodziony et al. |

(Continued)

OTHER PUBLICATIONS

"Adaptive Media Player," Akamai Media Delivery Solutions Product Brief, Akamai Technologies, Inc., 2014, 2 pages.

(Continued)

*Primary Examiner* — Oanh Duong
(74) *Attorney, Agent, or Firm* — Toler Law Group, PC

(57) ABSTRACT

A method includes receiving, at a computing device, a media stream. The method further includes generating, at the computing device, client analytics data associated with at least one of receiving, processing, or playback of the media stream. The method further includes transmitting, from the computing device, the client analytics data to an analytics device, the client analytics data including metadata indicating that the client analytics data is associated with a particular category of data.

14 Claims, 14 Drawing Sheets

(56) References Cited

U.S. PATENT DOCUMENTS

| | | | |
|---|---|---|---|
| 2011/0173264 A1 | 7/2011 | Kelly | |
| 2012/0151320 A1* | 6/2012 | McClements, IV | G06Q 10/101 715/230 |
| 2012/0317271 A1* | 12/2012 | Funk | H04L 67/12 709/224 |
| 2013/0104024 A1* | 4/2013 | Rajkumar | G06F 17/30781 715/234 |
| 2013/0282890 A1 | 10/2013 | Ma et al. | |
| 2015/0200863 A1 | 7/2015 | Wu | |
| 2017/0316443 A1* | 11/2017 | Goodhart | G06Q 30/0242 |
| 2017/0316466 A1* | 11/2017 | Goodhart | G06Q 30/0277 |

OTHER PUBLICATIONS

"Media Analytics," Akamai Media Delivery Solutions Product Brief, Akamai Technologies, Inc., 2014, 2 pages.

"Sola Analytics," Sola Media Solutions Product Brief, Akamai Technologies, Inc., 2012, 3 pages.

"ThePlatform and Conviva Bring Advanced Video Analytics to Customers," Press Release, http://www.conviva.com/theplatform-and-conviva-bring-advanced-video-analytics-to-customers/, Nov. 6, 2012, 4 pages.

"Analytics: Track Flowplayer Events with Google Analytics," http://flash.flowplayer.org/plugins/flash/analytics.html, printed Dec. 15, 2015, 5 pages.

Introduction to Kaltera's Cross-Platform Media Players, http://knowledge.kaltura.com/introduction-kalturas-cross-plafform-media-players, printed Dec. 15, 2015, 5 pages.

"FAQ: Analytics Module," Brightcove Support, Video Cloud, https://support.brightcove.com/en/video-cloud/docs/faq-analytics-module, printed Dec. 15, 2015, 5 pages.

Almeida et al., "Analysis of Educational Media Server Workloads," Proceedings of 11th International Workshop on Network and Operating System Support for Digital Audio and Video (NOSSDAV 2001), Port Jefferson, NY, Jun. 25-26, 2001, 10 pages.

Dalal et al., "A New Architecture for Measuring and Assessing Streaming Media Quality," Internet Systems and Storage Laboratory, HP Laboratories, Palo Alto, Feb. 10, 2003, 9 pages.

Gandhi, Ph.D., "A Comparative Analysis of IP Streaming Video Versus MPEG Video Over Cable," Cisco Systems, Inc, 2001, 10 pages.

Guo et al., "Analysis of Multimedia Workloads with Implications for Internet Streaming," WWW 2005, Chiba, Japan, May 10-14, 2005, 10 pages.

Hilley et al., "TV Watcher: Distributed Media Analysis and Correlation," CERS Technical Reports, http://gatech.edu/handle/1853/110, Georgia Institute of Technology, Jul. 8, 2004, 8 pages.

* cited by examiner

| Server ID | Client ID | Time | Event/Statistic |
|---|---|---|---|
| x23aemlp | c24eaiw | 16:14:30 | Request Media Chunk 1 of VOD item 1 |
| x23aemlp | | 16:14:32 | Receive Request for Media Chunk 1 of VOD item 1 from c24eaiw |
| x23aemlp | Jmle2S | 16:14:33 | Request Media Chunk 3 of VOD item 2 |
| x23aemlp | | 16:14:36 | Receive Request for Media Chunk 3 of VOD item 2 from Jmle2S |
| x23tmple | | 16:14:00 | Core temperature: 51°C, 65% memory free |
| x23aemlp | Jmle2S | 16:14:37 | Error - Requested Media Chunk Not Received (Media Chunk 3 of VOD item 2) |
| x23aemlp | y721a | 16:14:38 | Error - Requested Media Chunk Not Received (Media Chunk 6 of LIVESTREAM 2) |
| x23aemlp | u1iam | 16:14:39 | Error - Requested Media Chunk Not Received (Media Chunk 2 of VOD item 7) |

Customer 1 Analytics

*FIG. 7B*

MEDIA PLAYER ANALYTICS

BACKGROUND

The popularity of the Internet, coupled with the increasing capabilities of personal/mobile electronic devices, has provided consumers with the ability to enjoy multimedia content almost anytime and anywhere. For example, live content (e.g., sports events) and video on demand (VOD) content (e.g., television shows and movies) can be streamed via the Internet to personal electronic devices (e.g., computers, mobile phones and Internet-enabled televisions).

In some streaming scenarios, an application developer or vendor may receive performance statistics from a client that is streaming media from a server. In addition or in the alternative, the developer or vendor may receive performance statistics from the server. However, in some situations, the developer or vendor may not know how the client statistics relate to the server statistics, and may therefore be unable to gain insight into how server performance impacts client performance, and vice versa.

Moreover, as the number of media stream providers increases, the variety of performance statistics requested by the media stream providers may also increase. To illustrate, a television/movie streaming service may request collection and analysis of different statistics than those collected and analyzed by a live 24-hour news channel. Accordingly, it may be challenging for vendors of media streaming hardware/software to provide a "one-size-fits-all" analytics framework for all customers.

SUMMARY

The present application discloses various systems and methods of coordinating data analytics to improve performance of streaming servers, client devices, and analytics servers. In accordance with the present disclosure, a server identifier (ID) may be assigned to a streaming server, and the streaming server may include the server ID in data that is provided to a streaming client. For example, the streaming server may include the server ID in a master rendition list (e.g., a manifest, a playlist, etc.), a rendition chunk list, or media chunks (e.g., segments or fragments) distributed to a streaming client. During or after receiving a stream from the streaming server, the streaming client may send a client report to an analytics server (which in some examples may be distinct from the streaming server). In some embodiments, the streaming client may send multiple client reports to the analytics server. For example, the streaming client may send client reports at periodic intervals. The client report may identify one or more events that occurred at the streaming client. For example, the client report may identify events such as switching between adaptive bitrate renditions, rewinding/fast-forwarding/pausing a video, an error at the streaming client, etc. The client report includes the server ID and may include client timestamp(s) corresponding to the event(s) identified in the client report.

The streaming server may also send a report (e.g., a server report) to the analytics server. The server report may include statistics associated with operations at the streaming server. For example, the server report may include hardware performance statistics, the number of clients connected to the streaming server, details regarding streams being provided to each of the connected clients, etc. The server report further includes the server ID and may include server timestamp(s) indicating when the statistics identified in the server report were measured. Because both the client report and the server report include a common identifier (e.g., the server ID), the analytics server may correlate events at the streaming client with substantially contemporaneous performance characteristics and operating conditions at the streaming server, and vice versa. Correlating client analytics with server analytics may enable determination of how actions, events, or statistics measured at the client may affect the server or vice versa. Accordingly, correlating client analytics with server analytics may enable various advanced functions to improve an end-user media streaming experience, such as by adjusting streaming parameters at the streaming client and/or at the streaming server. For example, the techniques of the present disclosure may enable an analytics server to proactively or reactively adjust parameters at a client device so that a user experience of viewing a media stream at the client device is improved (e.g., by reducing stream lag or interruptions). As another example, the techniques of the present disclosure may enable an analytics server to proactively or reactively adjust parameters at a streaming server that is serving one or more streams to one or more client devices (e.g., by improving resource utilization at the streaming server).

The present application also discloses systems and methods that support categorizing analytics data received from the streaming client. For example, analytics data may be hierarchically or non-hierarchically categorized. Categorizing and tagging analytics data may enable grouping of analytics data into meaningful (e.g., to a customer of a streaming service) groupings (e.g., "buckets"), which may improve operation of the analytics server, such as by enabling faster analysis of analytics data and faster access to analytics data associated with a particular group. In addition, the present application discloses systems and methods that enable definition of customized analytics events/statistics/data. Such customization may provide the ability to tailor analytics sets for individual use cases.

BRIEF DESCRIPTION OF THE DRAWINGS

FIGS. 7A and 7B are diagrams of graphical user interfaces (GUIs) that may be output by an analytics server;

DETAILED DESCRIPTION

Figure 1:
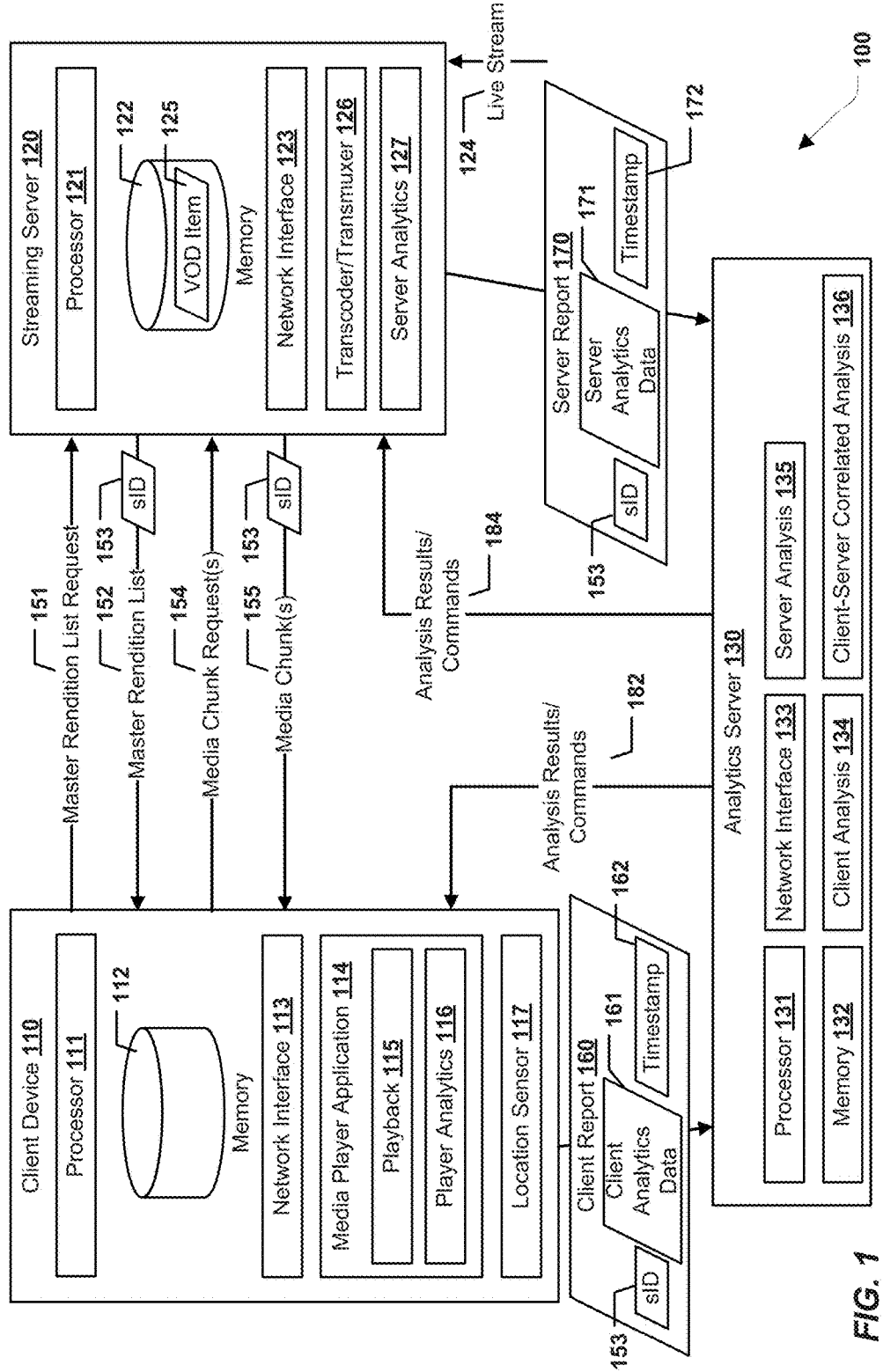
FIG. 1 is a diagram of a particular embodiment of a system that is operable to collect and analyze streaming analytics.

FIG. 1 is a diagram of a particular embodiment of a system 100 that includes a client device 110, a streaming server 120, and an analytics server 130. The client device 110, the streaming server 120, and the analytics server 130 may be communicably coupled via one or more networks. While illustrated in FIG. 1 as individual components, it is to be understood that one or more of the client device 110, the streaming server 120, or the analytics server 130 may be distributed across a plurality of devices. For example, the analytics server 130 may correspond to a plurality of redundant servers. In examples with redundant servers, the client device 110 may select or be routed to one or more of the redundant servers based on a geolocation of the client device 110, based on data provided by the client device 110, or based on some other factor(s). In the example of FIG. 1, the analytics server 130 is illustrated as being distinct from the streaming server 120. In alternative examples, however, the analytics server 130 and the streaming server 120 may be part of the same server or computing device. Thus, operations described herein with reference to the analytics server 130 may be performed by the streaming server 120, and vice versa.

The client device 110, the streaming server 120, and the analytics server 130 may each include a processor 111, 121, 131, a memory 112, 122, 132, and a network interface 113, 123, 133. Each of the network interfaces 112, 123, 133 enables communication via a network, such as a local area network (LAN), a wide area network (WAN), an Internet area network (IAN), or a combination thereof. One or more of the processors 111, 121, 131 may include one or more single or multi-core processors. One or more of the memories 112, 122, 132 may include a random access memory device, a hard disk drive, a solid state drive, another type of memory device, or a combination thereof. In particular embodiments, one or more of the memories 112, 122, 132 include more than one device. The network interfaces 113, 123, 133 may each include one or more wired and/or wireless interfaces, such as interfaces configured to communicate in accordance with an Institute of Electrical and Electronics Engineers standard (IEEE) (e.g., such as an IEEE 802.11 standard or an IEEE 802.3 standard), a third generation (3G) standard, a fourth generation (4G) standard, etc.

Examples of client devices include, but are not limited to, mobile phones, tablet computers, desktop computers, laptop computers, portable media players, wearable electronic devices, game consoles, televisions, set-top boxes, etc. The client device 110 may include a media player application 114. In a particular embodiment, the media player application 114 corresponds to software instructions stored in the memory 112 and executable by the processor 111 to perform media player functionality, hardware circuits of the client device 110, or a combination thereof. In some examples, the media player application 114 may be a standalone application that is downloaded or installed to the client device 110. In other examples, the media player application 114 is included in or invoked by another application executed at the client device 110. To illustrate, the media player application 114 may be invoked by a browser application when a user of the client device 110 navigates the browser application to a web page associated with a media stream, when the user selects a link to a media stream, etc. A media stream may include data corresponding to media content (e.g., video content, audio content, text content, image content, or a combination thereof).

The media player application 114 may include a playback module 115 configured to request and receive media streaming content from a streaming server (e.g., the streaming server 120) and to render the media streaming content on a display of the client device 110. The media player application 114 may also include a player analytics module 116 configured to determine, collect, and transmit analytics data associated with the client device 110, as further described herein.

In some examples, the client device 110 may include a location sensor 117. The location sensor 117 may be configured to determine a location of the client device 110. In particular embodiments, the location sensor 117 may correspond to or include a global positioning system (GPS) receiver. When the client device 110 includes the location sensor 117, the player analytics module 116 may be configured to communicate with the location sensor 117 to receive location information (e.g., for inclusion in analytics data transmitted from the client device 110). In some examples, the client device 110 may not include the location sensor 117, and the player analytics module 116 may determine the location information based on an Internet protocol (IP) address associated with the network interface 113.

In some examples, the streaming server 120 is a server computing device configured to perform streaming functionality. Alternatively, the streaming server 120 may be present in a cloud-based system and operations described with reference to the streaming server 120 may be performed by multiple computing devices in a cloud computing environment. The streaming server 120 may include a transcoder and/or transmuxer 126, such as a hardware transcoder/transmuxer or a software transcoder/transmuxer. The transcoder/transmuxer 126 may perform video processing functions to prepare a video stream for transmission to a client device, such as the client device 110. For example, a transcoder may be configured to generate new video data based on input video data, while a transmuxer may be configured to repackage input video data. It is therefore to be understood that the transcoder/transmuxer 126 of FIG. 1 is for illustrative purposes only and is not to be considered limiting. The techniques of the present disclosure can be applied in systems including streaming servers equipped with only transmuxers, only transcoders, or a combination of transcoders and transmuxers. In a particular embodiment, the streaming server 120 is configured to serve a video stream corresponding to a stored video on demand (VOD) item 125 or to a live stream 124 being received by the streaming server 120 from a stream capture source, such as a video camera. The streaming server 120 may also include a server analytics module 127 configured to determine, collect, and transmit analytics data associated with the streaming server 120, as further described herein.

The analytics server 130 may include a client analysis module 134, a server analysis module 135, and a client-server correlated analysis module 136. The modules 134-136 may correspond to or include hardware circuits of the analytics server 130, software stored in a computer readable device (e.g., the memory 132) and executable by the processor 131, or a combination thereof. In some examples, components or functions of the analytics server 130 may be distributed among more than one device. For example, a first set of devices may include components and perform functions associated with receiving analytics data, and a second set of devices may include components and perform functions associated with analyzing analytics data. The client analysis module 134 may be configured to perform analysis operations based on analytics data received from one or more client devices, such as the client device 110. The server analysis module 135 may be configured to perform analysis operations based on analytics data received from one or more streaming servers, such as the streaming server 120. The correlated analysis module 136 may perform analysis operations based on analytics data received from one or more client devices and one or more streaming servers, as further described herein.

In operation, a user of the client device 110 may initiate execution of the media player application 114. To illustrate, the user of the client device 110 may navigate a browser application to a web page, where the media player application 114 is embedded in the web page or the web page includes code that causes the media player application 114 to be loaded. Alternatively, the user of the client device 110 may select a link to a video stream on a web page, where the selection of the link initiates execution of the media player application 114. As yet another example, the user may initiate execution of the media player application 114 as a standalone application that is installed on the client device 110.

In some examples, a three-phase process may be used during delivery of content, although it is to be understood that alternative embodiments may involve, more steps, fewer steps, a different order of steps, or any combination thereof. In accordance with an illustrative, non-limiting example, a three-phase process may involve a device receiving a master rendition list, then receiving a rendition chunk list corresponding to a rendition identified by the master rendition list, and then receiving one or more media chunks identified by the rendition chunk list. To illustrate, the media player application 114 may cause the client device 110 to transmit a master rendition list request 151 to the streaming server 120 via the network interface 113. The streaming server 120 may receive the master rendition list request 151 via the network interface 123. In a particular example, the master rendition list request 151 may identify a video on demand (VOD) item 125 stored in the memory 122. In response to the master rendition list request 151, the processor 121 may identify or generate a master rendition list 152 (e.g., a manifest) associated with the VOD item 125. In response to the master rendition list request 151, the processor 121 may cause the network interface 123 to transmit the master rendition list 152 and a server ID ("sID" in FIG. 1) 153 associated with the streaming server 120 to the client device 110. The server ID 153 may be a combination of characters (e.g., numbers, letters, symbols, or a combination thereof) that identifies the streaming server 120. The server ID 153 may be a globally unique identifier. Alternatively, the server ID 153 may be unique within a set of server IDs known to the analytics server 130 (or to a set of analytics servers). In particular examples, the server ID 153 may be assigned by a network entity (e.g., the analytics server) or may be automatically determined based on another identifier of the streaming server 120, such as a media access control (MAC) address of the network interface 123.

The client device 110 may use the master rendition list 152 to request one or more rendition chunk lists and may use the one or more rendition chunk lists to request one or more media chunks of the VOD item 125 (e.g., based on URLs or URL templates included in the rendition chunk list(s)). For example, the client device 110 may transmit one or more media chunk requests 154 to the streaming server 120 via the network interface 113. In some examples, the client device 110 may periodically transmit requests for rendition chunk lists when requesting rendition chunk lists corresponding to a live stream (e.g., because new media chunks may be added to a rendition chunk list as more of the live stream is received by the streaming server 120). Similarly, the client device 110 may transmit a single request for a rendition chunk list when the rendition chunk list corresponds to a video on demand item. The streaming server 120 may receive the media chunk requests 154 via the network interface 123. In response to the media chunk requests 154, the processor 121 may cause the network interface 123 to transmit one or more media chunks 155 of the VOD item 125 to the client device 110. When the streaming server 120 supports adaptive bitrate (ABR) streaming, the media chunks may correspond to portions of one or more ABR renditions of the VOD item 125 that are generated by the transcoder/transmuxer 126 or received from another source. For VOD, multiple renditions may be stored in a single VOD file or in multiple VOD files (e.g., where each VOD file includes a single rendition). In some examples, a VOD file may be transcoded into one or more different renditions. For live streams, the streaming server 120 may receive one or more renditions and may use the transcoder/transmuxer 126 to generate additional renditions. Alternatively, for live streams, the streaming server 120 may receive all renditions that are to be made available for streaming, and may thus not use the transcoder/transmuxer 126 to generate additional renditions. Adaptive streaming and transcoding operations are further described with reference to FIG. 9. In some examples, the streaming server 120 includes the server ID 153 when transmitting the media chunks 155 to the client device 110. In some examples, the client device 110 may send the media chunk requests 154 to a first streaming server, and the first streaming server may either provide the requested media chunks 154 to the client device 110 or may forward the media chunk requests 154 to another streaming server (e.g., of a server farm) for servicing. In such examples, the first streaming server may thus perform load balancing for media chunk requests.

While the above example describes the client device 110 requesting a stream corresponding to VOD content, in alternative examples, the client device 110 may request and receive a live stream (or ABR renditions thereof). For example, the streaming server 120 may receive (and, in some examples, may transcode/transmux) the live stream 124. In some examples, the live stream 124 may correspond to a plurality of streams. As in the VOD example, the streaming server 120 may transmit the server ID 153 with a master rendition list (or other information) associated with the live stream 124. Alternatively, or in addition, the streaming server 120 may transmit the server ID 153 with media chunks of the live stream 124 (or ABR renditions thereof). Thus, the media chunks 155 may correspond to the live stream 124 or the VOD item 125.

While receiving the media chunks 155, media player application 114 may utilize the playback module 115 to render and present a representation of the VOD item 125 (or the live stream 124, which in some examples corresponds to multiple streams). Further, the media player application 114 may utilize the player analytics module 116 to identify events associated with receiving the media chunks 155, receiving the master rendition list 152, receiving rendition chunk lists, user interactions associated with the media player application 114, user interactions associated with other applications (e.g., a web browser or a social media application), presenting the representation, events associated with a status of a the client device 110 (e.g., a battery level, a physical orientation of the client device 110, display settings of the client device 110, volume settings of the client device 110, movement of the client device 110, etc.), or a combination thereof. Thus, events identified at the client device 110 may include events related to the media player application 114 as well as events unrelated to the media player application 114 or user interaction therewith. An illustrative non-limiting example of a user interaction associated with the media player application 114 is accessing alternate content included with the media chunks 155, such as closed caption or subtitle data, data events, alternate camera angles, alternate audio tracks, commentary tracks, etc. The player analytics module 116 may further identify statistics, such as a location of the client device 110 determined by location sensor 117, hardware statistics (e.g., a temperature of the processor 111, usage of system memory of the client device 110, etc.), network statistics (e.g., jitter, dropped packets, round-trip latency, bandwidth usage, etc.), content statistics (e.g., a number of plays of a media content item), or a combination thereof.

In a particular embodiment, the player analytics module 116 may store the identified events and/or statistics as player report data in the memory 112. The player report data may correspond to an in-memory (e.g., in-random access memory (RAM)) data structure, may correspond to a log file, or may correspond to another type of data structure or file. In some examples, the player report data may be sent to an external storage device. The player report data, which may correspond to one or more events, may correspond to one or more statistics, or may correspond to a combination thereof, may indicate that the identified event(s) and/or statistic(s) are associated with the streaming server 120 having the server ID 153. Further, the player analytics module 116 may tag each event and/or statistic with a timestamp indicating when the event and/or statistic was measured or determined.

The player analytics module 116 may further generate a client report 160 and cause the network interface 113 to transmit the client report 160 to the analytics server 130. The client report 160 may include client analytics data 161 identifying one or more events and/or statistics logged by the player analytics module 116, as described above. The client report 160 may include the server ID 153 and one or more timestamps 162. For example, each event and/or statistic described by the client analytics data 161 may have an associated timestamp 162, as described above. In particular embodiments, the client report 160 may additionally include a client ID that (e.g., uniquely) identifies the client device 110, the media player application 114, or a combination thereof. Client reports, such as the client report 160, may be transmitted by the client device 110 periodically (e.g., based on a clock), in response to user input, in response to a particular event (e.g., a "trigger" event, such as playback of a stream starting, playback of a stream ending, etc.) at the client device 110, or in response to a request from another device (e.g., the analytics server 130 or the streaming server 120).

During operation at the streaming server 120, the server analytics module 127 may generate server report data to be stored in the memory 122. The server report data may correspond to an in-memory (e.g., in-RAM) data structure, may correspond to a log file, or may correspond to another type of data structure or file. The server report data may identify one or more statistics associated with operations of the streaming server 120. For example, the server report data may identify a number of outbound streams being served by the streaming server 120, a number of clients connected to the streaming server 120, output stream bitrates (e.g., bitrates of ABR renditions being served), types of streams being served (e.g., live vs. VOD vs. digital video recorder (DVR)), a work load of the streaming server 120 (e.g., how many processes, such as transcoders, are executing on the streaming server 120), media content statistics (e.g., which media content items are being streamed), hardware statistics (e.g., memory usage, processor temperature, throughput usage, etc.), and other statistics. Each statistic in the server report data may be associated with a timestamp identifying when the server analytics module 127 determined or measured the statistic.

Further, the server analytics module 127 may generate a server report 170. The server report 170 may include the server ID 153 and server analytics data 171 identifying one or more statistics associated with operation of the streaming server 120, where each statistics is associated with a timestamp 172, as described above with reference to the server report data. The server analytics module 127 may cause the network interface 123 to transmit the server report 170 to the analytics server 130. The server report 170 may be transmitted to the analytics server 130 periodically (e.g., based on a clock), in response to a request from the analytics server, or in response to one or more particular events occurring at the streaming server 120. In a batch collection example, server analytics data may be parsed and the server report 170 may be transmitted to the analytics server 130 once per day. In some examples, server analytics data may be sent to the analytics server 130 more frequently or less frequently.

Although the foregoing example describes the client device 110 and the streaming server 120 maintaining report data and transmitting reports 160, 170 that include multiple events/statistics, it is to be understood that this is not to be considered limiting. The client device 110 and/or the streaming server 120 may additionally or alternatively transmit data regarding individual events/statistics in real-time or near-real-time rather than buffering report data for subsequent transmission. In some examples, analytics data is buffered and transmission is retried in the event of a transmission error, a lost network connection, etc.

The analytics server 130 may receive the client report 160 and the server report 170 via the network interface 133. The analytics server 130 may store the client report 160 and the server report 170 in a storage device (e.g., the memory 132), which may correspond to RAM, disk storage, flash storage, and/or another type of storage device. The modules 134-136 may perform analytics operations based on the client report 160, the server report 170, and/or additional client reports and server reports received from other client devices and streaming servers.

In particular embodiments, the correlated analysis module 136 may determine that the client report 160 (or the client analytics data 161), or a portion thereof, is correlated to the server report 170 (or the server analytics data 171), or a portion thereof, based on the reports 160, 170 including a common identifier (e.g., the server ID 153). The correlated analysis module 136 may also determine temporal correlation between the client analytics data 161 and the server analytics data 171 based on the timestamps 162, 172. The timestamp 162 may "correspond to" the timestamp 172 when the timestamps 162, 172 are equal or within a threshold range of each other (e.g., clocks at the client device 110 and the streaming server 120 need not be synchronized or need not generate analytics data at precisely the same time). In some examples, the client device 110 and the streaming server 120 generate the timestamps 162, 172 based on a common clock (e.g., a universal network-accessible clock) or based on a clock synchronization procedure that is performed during setup of a streaming session.

The modules 134-136 may determine various types of streaming analytics information. For example, the information may indicate how user engagement (e.g., how long users watch a stream, how often users post on social media regarding a stream, etc.) correlates to streaming server load (e.g., number of concurrent client device connections, processor utilization, memory utilization, network bandwidth/throughput, etc.). As another example, the information may indicate how user engagement correlates to stream quality (e.g., how many and which ABR renditions are being generated/transmitted, encoders/decoders in use, transcoder settings, etc.). As another example, the information may indicate how user engagement correlates to errors at streaming server(s) and/or client device(s). As another example, the information may indicate how ABR behavior (e.g., when/how often/how many times client devices change ABR renditions) correlate to streaming server load, stream quality, or errors.

In some examples, the analytics server 130 may generate and transmit analysis results/commands 182, 184 to the client device 110, to the streaming server 120, or to both. For example, when user engagement drops, the analytics server 130 may send the client device 110, the streaming server 120, or both, commands requesting additional performance statistics or metrics, commands triggering execution of particular applications or functions (e.g., health monitoring software at a streaming server), etc. As another example, based on the streaming server 120 indicating a change in number of client connections or computing resources, the analytics server 130 may proactively instruct the client device 110 to request a different ABR rendition. As another example, based on the client device 110 indicating the occurrence of a particular kind of error, the analytics server 130 may instruct the client device 110 to perform one or more error-correction actions or may instruct the streaming server 120 to send test data to the client device 110. The client device 110 may process the test data and determine why the error occurred (e.g., encoder/decoder incompatibility, network packet drops, etc.). As another example, the analytics server 130 may instruct the streaming server 120 to add or remove certain connected client devices, start or stop accepting new client device connections, add or remove certain ABR renditions (e.g., make an audio-only ABR rendition available due to drops in client device bandwidth or video encoder/decoder incompatibility indicated in client reports received from client devices), etc. As yet another example, the analytics server 130 may instruct the client device 110 to switch to a different content delivery network (CDN), a different edge server, a different streaming server, etc. based on received client reports indicating a high round-trip latency, a large number of dropped packets, or a small available network bandwidth. As yet another example, the analytics server 130 may instruct the streaming server 120 or the client device 110 to advertise premium features (e.g., surround sound, ultra-high-definition video, digital video recording (DVR) capability, etc.) or offer the premium features at a discount in response to determining that client reports indicate that few or no client devices are using the premium features. The analytics server 130 may instruct a single client device, a single streaming server, multiple client devices, or multiple streaming servers, depending on conditions present in the system 100. In addition or in the alternative to issuing instructions based on client reports and the server reports, the analytics server 130 may output data (e.g., via a graphical user interface) corresponding to the client reports and the server reports. In an illustrative non-limiting example, such output data may be requested and output via a web interface provided by the analytics server 130. For example, a user or owner of a device (e.g., the streaming server 120 and/or the client device 110), a streaming content provider, a cloud service provider, a CDN, etc. may generate reports regarding performance of various devices involved in providing media streams to users. Output data of the analytics server 130 is described in more detail below with reference to FIGS. 7A and 7B.

It is to be understood that the examples described herein are for illustrative purposes only and are not to be considered limiting. The systems and methods of the present disclose may enable proactively or reactively instructing a client device and/or a streaming server to perform any operation that may mitigate (or reduce the likelihood of) an error, improve streaming performance, increase revenue generated by a streaming service provider, decrease a cost incurred by a streaming service provider or a user, etc. The systems and methods of the present disclosure may also enable reporting of client data, server data, and correlated client/server data.

The system 100 may thus support collection, storage, transmission, and reporting of analytics data by streaming servers (e.g., the streaming server 120) and client devices (e.g., the client device 110). The analytics data may be processed by the analytics server 130 in correlated fashion based on the presence of a common identifier, such as the server ID 153. The ability to correlate client analytics data to server analytics data may provide a more holistic understanding of operations at the system 100 and may enable the analytics server 130 to improve overall streaming performance at the system 100, for example by instructing the client device 110 or the streaming server 120 to perform certain operations. Accordingly, the system 100 may support adjustment of streaming operations based on data that may have been previously unavailable or uncorrelated. Moreover, the system 100 may support reporting such data to various interested parties.

Figure 2:
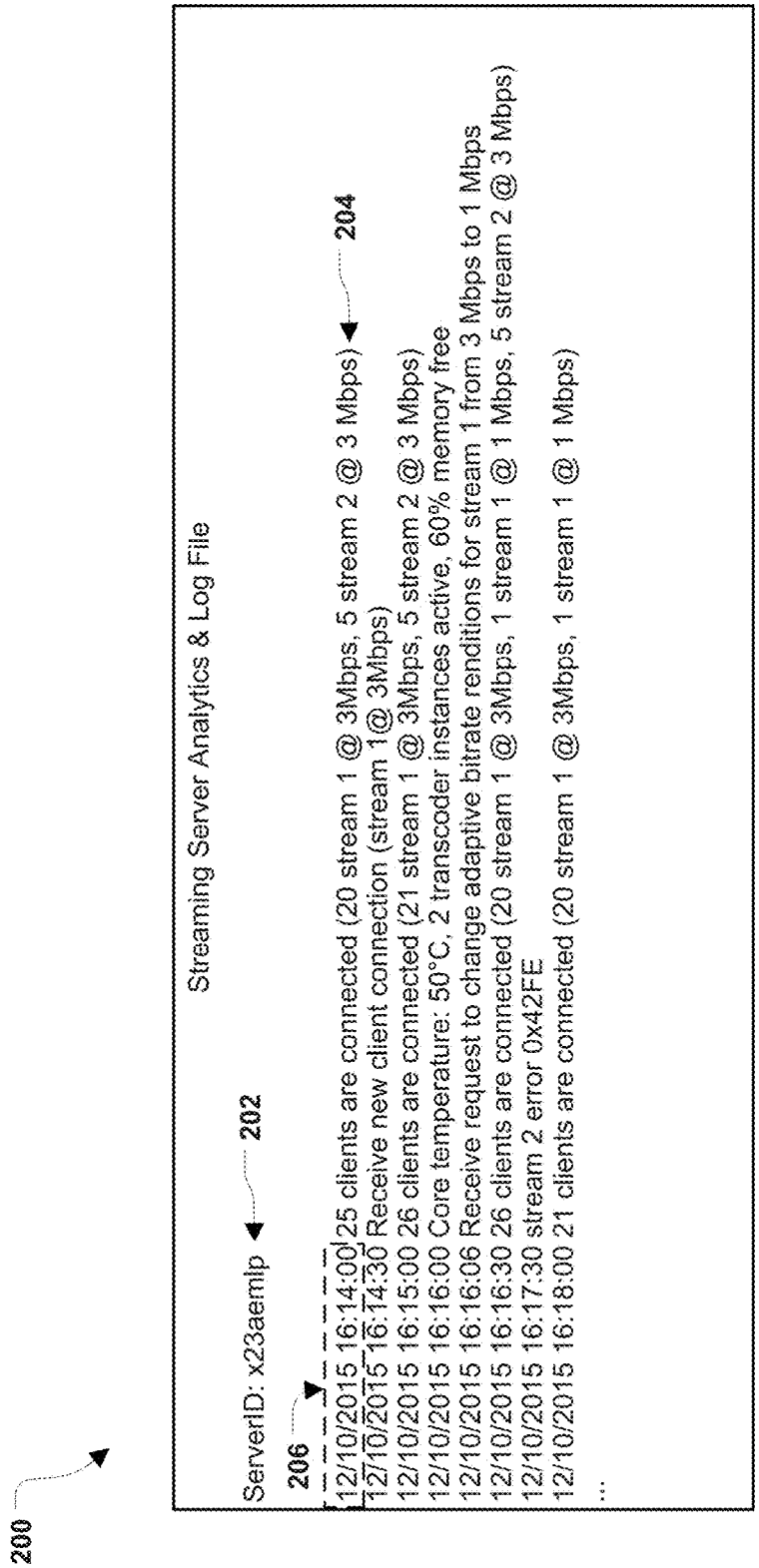
FIG. 2 is a diagram illustrating a particular embodiment of a steaming server analytics report.

Referring to FIG. 2, a diagram depicting an example of a server log file 200 that may be generated at the streaming server 120 of FIG. 1 is illustrated. For example, the server log file 200 may be generated by the server analytics module 127 of FIG. 1. The server log file 200 may include entries corresponding to data that is included in the server report 170 of FIG. 1. For example, the server log file 200 may include a server ID 202, which may correspond to the server ID 153 of FIG. 1. Although FIG. 2 illustrates a log file, it is to be understood that in alternative embodiments, data of the log file may also or in the alternative be stored in an in-memory data structure of a streaming server.

The server log file 200 may include a plurality of entries corresponding to the server analytics data 171 of FIG. 1. An illustrative entry 204 includes a timestamp 206 indicating when the server analytics module 127 identified, determined, or measured the statistics/event listed in entry 204. Entries in the server log file 200, such as the entry 204, may identify various statistics and/or events associated with the streaming server 120, such as how many clients devices are connected to the streaming server 120, when a new client device connection is received, the "current" status of hardware (e.g., temperature, usage, etc.), when various streaming requests are received, when errors occur, etc.

Figure 3:
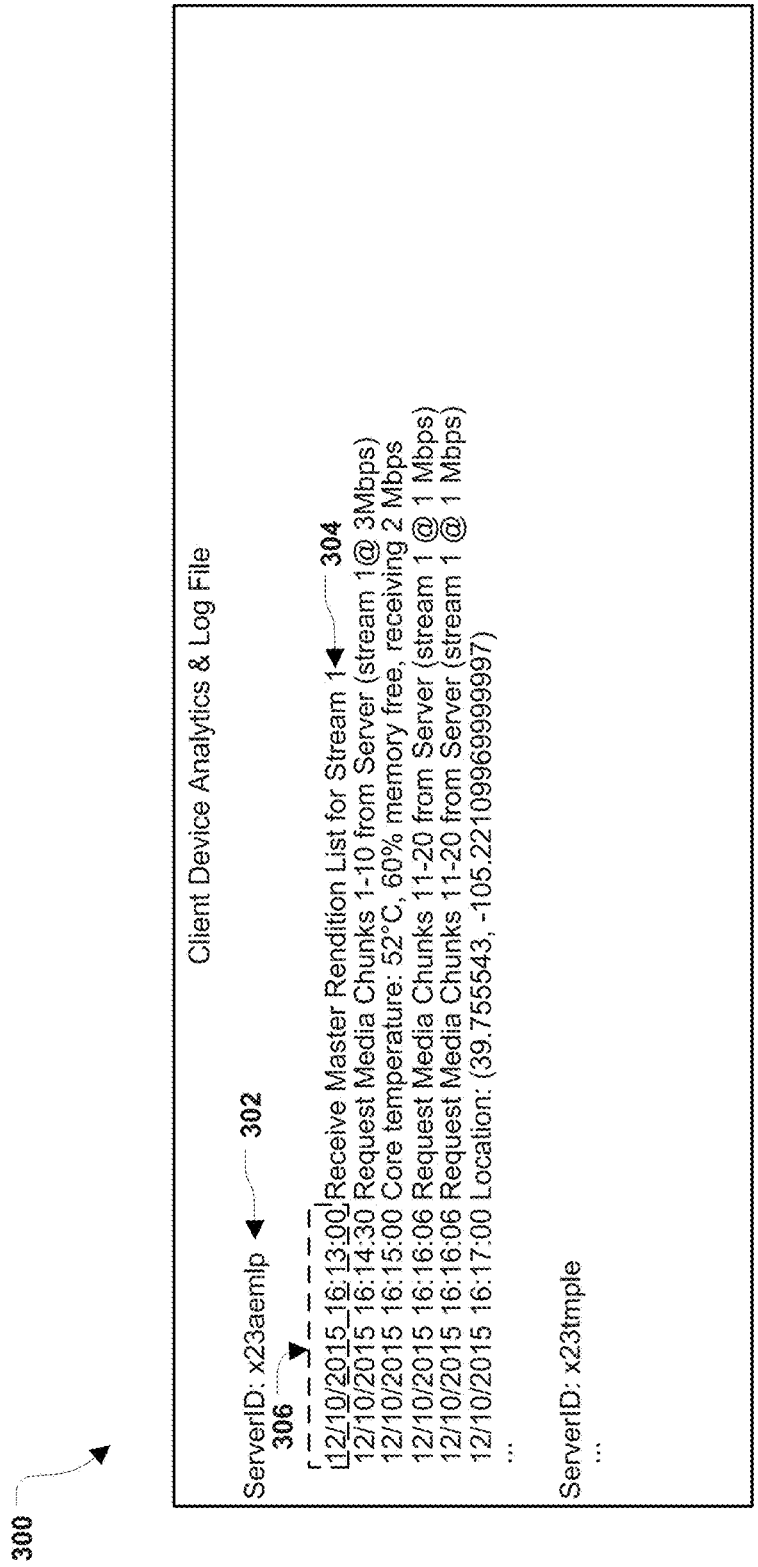
FIG. 3 is a diagram illustrating a particular embodiment of a client device analytics report.

Referring to FIG. 3, a diagram depicting an example of a client log file 300 that may be generated at the client device 110 of FIG. 1 is illustrated. For example, the client log file 300 may be generated by the player analytics module 116 of FIG. 1. The client log file 300 may include entries corresponding to data that is included in the client report 160 of FIG. 1. For example, the client log file 300 may include a server ID 302, which may correspond to the server ID 153 of FIG. 1. Although FIG. 3 illustrates a log file, it is to be understood that in alternative embodiments, data of the log file may also, or in the alternative, be stored in an in-memory data structure of a client device.

The client log file 300 may include a plurality of entries corresponding to the client analytics data 161 of FIG. 1. An illustrative entry 304 includes a timestamp 306 indicating when the player analytics module 116 identified, determined, or measured the statistics/event listed in entry 304. Entries in the client log file 300, such as the entry 304, may identify various statistics and/or events associated with the media player application 114 or the client device 110, such as when a master rendition list is requested and received, when rendition chunk list(s) are requested and received, when media chunk(s) are requested and received, the "current" status of hardware (e.g., temperature, usage, etc.), when a switch to a different ABR rendition occurs, when errors occur, user engagement information, user interactions (e.g., pausing, rewinding, or fast forwarding a stream), a location of the client device 110, etc. In addition, entries of the client log file 300 may include statistics and/or events associated with another application at the client device 110 or with a web page viewed at the client device 110. For example, the client log file 300 may include entries describing user interaction with a social media application or web page.

Figure 4:
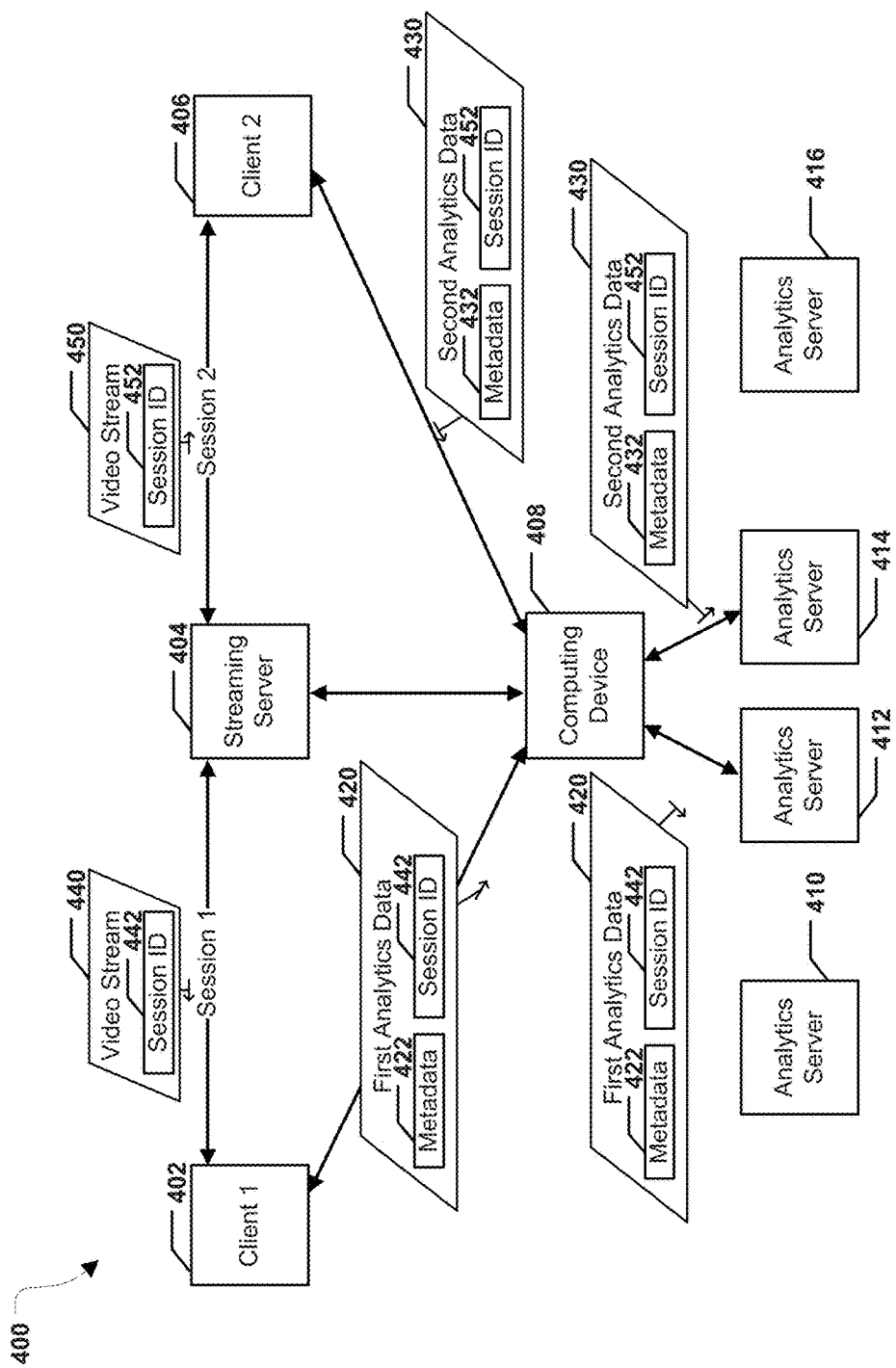
FIG. 4 is a diagram of another particular embodiment of a system that is operable to collect and analyze streaming analytics.

Referring to FIG. 4, a diagram of a system 400 for generating, distributing, and processing media player analytics data is shown. The system 400 includes a first client 402 and a second client 406. One or both of the clients 402, 406 may include components corresponding to components of the client device 110 of FIG. 1. The system 400 further includes a streaming server 404. In particular examples, the streaming server 404 may correspond to a plurality of streaming servers. The streaming server 404 may include components corresponding to the components of the streaming server 120 of FIG. 1. The system 400 may further include a computing device 408. The computing device 408 may include a processor, memory, and one or more network interfaces (not shown). The system 400 may further include a first analytics server 410, a second analytics server 412, a third analytics server 414, and a fourth analytics server 416. One or more of the analytics servers 410-416 may include components analogous to components of the analytics server 130 of FIG. 1. Although four analytics servers 410-416 are shown in FIG. 4, it is to be understood that more or fewer analytics servers may be present in alternative embodiments.

In operation, each of the clients 402, 406 may stream media from the streaming server 404. For example, the first client 402 may establish a first streaming session with the streaming server 404 and receive a video stream 440 during the first streaming session. The first streaming session may be associated with a session ID 442 and the video stream 440 may include the session ID 442 (e.g., the session ID 442 may be included in a master rendition list, in individual rendition chunk lists, in individual media chunk(s), in a stream URL, etc.). As used herein, a session ID may (e.g., uniquely) identify a streaming session, such as a hypertext transfer protocol (HTTP)-based ABR streaming session, between a client device and a streaming server, during which the client device 110 may receive a video stream from the streaming server. When the same client device conducts multiple concurrent or non-concurrent streaming sessions with the same streaming server, each of the streaming sessions may have a different session ID.

Similarly, the second client 406 may establish a second streaming session with the streaming server 404 and receive a video stream 450 during the second streaming session. The second streaming session may precede, be at least partially concurrent with, or may follow the first streaming session. The second streaming session may be associated with a session ID 452 and the video stream 450 may include the session ID 452 (e.g., the session ID 452 may be included in a master rendition list, in individual rendition chunk lists, in individual media chunk(s), in a stream URL, etc.). The video streams 440, 450 may correspond to the same video content or to different video content. In some embodiments, the streaming server 404 may send video streams to a CDN (e.g., to one or more geographically distributed edge servers of the CDN) for further downstream distribution to clients. In such embodiments, the first client 402 and the second client 406 may each receive a video stream with the same session ID (e.g., because there may be a single request from the CDN to the streaming server 404), but the clients 402, 406 may have different client IDs. Accordingly, the session ID 442 may be the same or may be different from the session ID 452, and client IDs may be used to distinguish clients in situations where the session IDs 442, 452 are the same.

While receiving the video stream 440, the first client 402 may generate first analytics data 420. For example, the first client 402 may generate the first analytics data 420. The first analytics data 420 may correspond to the client analytics data 161 or to the client report 160 of FIG. 1. Accordingly, the first analytics data 420 may include one or more timestamp(s) and server ID(s). In other examples, the first analytics data 420 may not include timestamp(s) and/or server ID(s). Alternatively, or in addition, the first analytics data 420 may include metadata 422 and/or the session ID 442. In particular examples, the metadata 422 categorizes the first analytics data 420 according to a hierarchy, as described further with reference to FIG. 5. The metadata 422 may alternatively correspond to a list of (e.g., non-hierarchical) labels or tags associated with the first analytics data 420.

The first client 402 may send the first analytics data 420 to the computing device 408, as shown. The computing device 408 may receive the first analytics data 420 and route the first analytics data 420 to one of the analytics servers 410-416 based on the metadata 422, the session identifier 442, or a combination thereof. For example, the metadata 422 may identify the first analytics data 420 as belonging to a first particular hierarchical category. The computing device 408 may identify the second analytics server 412 as corresponding to the first particular hierarchical category and route the first analytics data 420 to the second analytics server 412. In other examples, the first client 402 may send the first analytics data 420 to one of the analytics servers 410-416.

Similarly, while receiving the video stream 450, the second client 406 may generate second analytics data 430. The second analytics data 430 may include one or more timestamp(s) and server ID(s). In other examples, the second analytics data may not include timestamp(s) and/or server ID(s). Alternatively, or in addition, the second analytics data 430 may include metadata 432 and/or the session ID 452. In particular examples, the metadata 432 categorizes the second analytics data 430 according to a category hierarchy, as described further with reference to FIG. 5. The metadata 432 may alternatively correspond to a list of (e.g. non-hierarchical) labels or tags associated with the second analytics data 430.

The second client 406 may send the second analytics data 430 to the computing device 408, as shown. The computing device 408 may receive the second analytics data 430 and route the second analytics data 430 to one of the analytics servers 410-416 based on the metadata 432, the session ID 452, the load of one or more of the analytics servers 410-416, the geo-location of one or more of the analytics servers 410-416, or a combination thereof. For example, the metadata 432 may identify the second analytics data 430 as belonging to a second particular hierarchical category. The computing device 408 may identify the third analytics server 414 as corresponding to the second particular hierarchical category and route the second analytics data 430 to the third analytics server 414 accordingly.

Depending on the particular implementation, different analytics servers may be assigned to different streaming servers, different groups of clients, different types of media streams, etc. The computing device 408 may thus utilize information included in client analytics data to route data to an appropriate analytics server, which may enable load balancing at the system 400. In some examples, the computing device 408 may receive commands (e.g., the analysis results/commands 182 or the analysis results/commands 184) from the analytics servers 410-416 and forward the commands to the appropriate client or streaming server. Alternatively, the analytics servers 410-416 may transmit the commands to the clients or streaming servers without transmitting to the computing device 408.

Thus, FIG. 4 illustrates how analytics data may be sent to different analytics servers based on the type of statistics/events described by the analytics data (e.g., as indicated by metadata), based on a session ID, or a combination thereof. Accordingly, the work load of any particular analytics server may be reduced.

Figure 5:
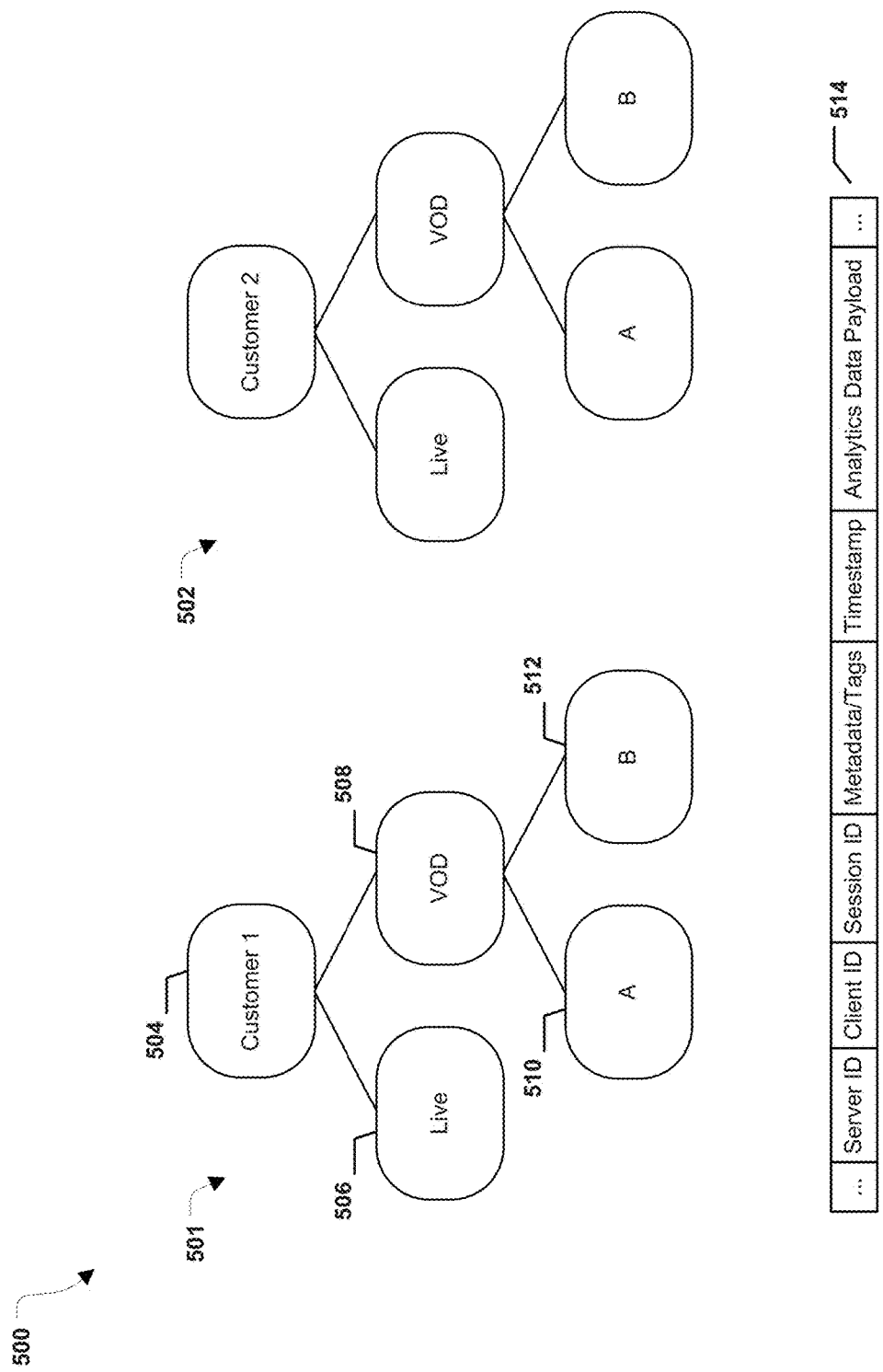
FIG. 5 is a diagram illustrating a particular example of hierarchical categorization of streaming analytics.

Referring to FIG. 5, a diagram 500 illustrating hierarchical classification of analytics data is shown. The diagram 500 illustrates a first tree structure 501 and a second tree structure 502, each including a hierarchical classification of analytics data. The metadata 422, 432 may indicate node(s) of the tree structures 501, 502, and may thus indicate a hierarchical classification of analytics data.

Categorizing analytics data may enable a streaming service provider to group data into meaningful sets for analysis. For example, analytics data may be categorized by customer, individual application or stream, market segment, A/B testing of an application or website feature, VOD vs. live streaming, paying vs. non-paying client devices, cloud vs. on-premises stream delivery, CDN used for stream delivery, media player application version (e.g., trial vs. paid user or media player application, version number, etc.), etc.

In the illustrated example, the first tree structure 501 includes a customer 1 node 504. Analytics data associated with customer 1 may correspond to the node 504 or to a child node of the node 504. Customer 1 may be a content provider (e.g., a television network, movie studio, etc.) that utilizes a streaming service to provide content to users. Such a streaming service may provide streaming servers (e.g., the streaming server 120 or the streaming server 404) to distribute content, such as the VOD item 125 or the live stream 124. The customer 1 node 504 has two child nodes: a live node 506 and a VOD node 508. Thus, analytics data associated with live streams of customer 1 may correspond to the node 506 (or a child node thereof), and analytics data associated with VOD streams of customer 1 may correspond to the node 508 (or a child node thereof). The VOD node 508 has two child nodes, an A node 510 and a B node 512, corresponding to A/B website testing. Thus, analytics data generated by client devices visiting the A version of the website may correspond to the node 510 (or a child node thereof), and analytics data generated by client devices visiting the B version of the website may correspond to the node 512. Categorizing data as shown in the first tree structure 501 may enable comparing sets of analytics data (e.g., VOD performance vs. live performance, A website performance vs. B website performance, etc.). To illustrate, the tree structures 501, 502 may enable answering performance queries such as "show me all VOD plays for customer 2," "show me user engagement data for the VOD item 'BigBuckBunny,'" "show me a comparison of performance statistics between the A and B versions of the website," etc.

In the example of FIG. 5, the tree structures 501, 502 have the same hierarchical structure of nodes. In alternative examples, different hierarchical structures may be defined for different customers (or other root nodes). Thus, other hierarchical classification schemes may be used according to the systems and methods described herein. In a particular example, different analytics servers may be associated with different node(s) of the tree structures 501, 502. The computing device 408 of FIG. 4 may thus route analytics data to one of the analytics servers 410-416 based on which node is indicated by metadata associated with the analytics data. Accordingly, FIG. 5 illustrates a hierarchical classification scheme that may be used to classify and route analytics data.

FIG. 5 also illustrates an example 514 of how client analytics data or server analytics data may be formatted. In particular, as shown in FIG. 5, each analytics data payload (e.g., event or statistic) may include or be associated with one or more of a server ID, a client ID, a session ID, metadata/tags, and a timestamp. The metadata/tags may be hierarchical (as described with reference to the tree structures 501, 502) or may be non-hierarchical. To illustrate, suppose that for data analysis purposes, a customer sets up metadata/tags to compare user engagement for trial vs. paid users, A/B versions of a website, and if the user was referred from a partner's website. When a media player application or streaming session is configured, metadata/tags may be assigned to represent these attributes. For example, analytics data from a first client may have the metadata/tags "trial," "A," and "partner1" indicating that the analytics data is associated with a trial version of a media player application streaming content in response to interaction with an "A" version of a website of a partner1 (partner1 may be a partner of a streaming service customer). Analytics data from a second client may have the metadata/tags "paid," and "B." Analytics data from a third client may have the metadata/tags "paid," "B," and "partner2" indicating that the analytics data is associated with a paid version of a media player application streaming content in response to interaction with an "B" version of a website of a partner2 (partner2 may be a partner of a streaming service customer). Querying analytics data based on the metadata/tags may enable answering queries such as "show me (e.g., a streaming service customer) engagement data for all trial viewers coming from partner 1 (e.g., a partner of the streaming service customer)," "show me (e.g., a streaming service customer) engagement data coming from paid customers with traffic coming from our website (rather than partners)," etc. Metadata/tags may thus, in some examples, be assigned on a per-session basis.

It is to be understood that the various examples of server-side and client-side analytics data described herein are for example only and are not to be considered limiting. Additional illustrative, non-limiting examples of client-side analytics are provided in Table 1 below.

TABLE 1

| Analytics Event/Data Type | Header or Payload Fields |
|---|---|
| INIT | analytics schema version, session ID, customer ID, customer license key, customer partition, metadata tags, client IP address, authorization string, authorization schema version, time/date (Posix milliseconds (ms) since Jan. 1, 1970) |
| PLAY_START | analytics schema version, payload type, ASSET, VIEWER, PLAYER, PLAYER_TECH, PLATFORM, BROWSER, server ID, time (e.g., coordinated universal time (UTC)), time zone offset, daylight savings time offset, authorization schema version, time/date (Posix ms since Jan. 1, 1970) |
| ASSET | asset ID (e.g., stream URL), base URL (not including query parameters), full URL (including query parameters), duration (if VOD asset), VOD (true/false), live (true/false), DVR (true/false), autoplay (true/false), bitrate, audio codec, audio codec string, audio codec ID, number of audio channels, audio frequency, audio samples per frame, video codec, video codec string, video codec ID, frame horizontal size, frame vertical size, display horizontal size, display vertical size, video frame rate, video key frame interval, video profile, video level |
| VIEWER | viewer ID, viewer creation time, first time viewer ID created (true/false) |
| PLAYER | player type, player version, build date, build number, asset base URL, web page URL, player properties (e.g., title, debug level, ABR auto switching enabled, watermark location, volume, show quick rewind, debug log, mute, loop, audio only, show full screen, show duration vs. time remaining, source URL, auto play, debug streamer, buffer time fill, show bitrate selector, show closed caption selector, stream retry media chunk interval, show share, debug analytics, retry media chunk maximum retries, show casting, debug stats, use hardware decoding, show seek hover preview, starting bitrate, poster frame fill mode, capture debug analytics, quick rewind seconds, show watermark, limit by screen size, etc.) |
| PLAYER_TECH | version, player type, is debugger, has input method editor (IME), has MP3 decoder, has printing, has screen broadcast, has screen playback, has streaming audio, has streaming video, supports TLS, has video encoder, is embedded in document reader, language, file read disable, manufacturer, max H264 IDC level, operating system, pixel aspect ratio, screen color, screen dots per inch, horizontal resolution, vertical resolution, 32 bit, 64 bit, touchscreen type, avHardware disable, CPU architecture, accessibility, audio, audio encoder, has embedded video, true/false flags for specific audio codecs |
| PLATFORM | architecture, operating system |
| BROWSER | browser code name, browser name, version, language code, platform, product, user agent, cookies enabled, online |
| UPDATE | analytics schema version, payload type, array of EVENTs |
| FINISH | analytics schema version, payload type, array of EVENTs |
| CHUNK EVENT | event sequence number, event type ("chunk"), media chunk URL, current bitrate, ABR engine in manual mode?, number of bytes in media chunk, total bytes downloaded, download duration, parse duration, buffer fullness (minimum time, maximum time, minimum frames, maximum frames) |
| MARKER EVENT | [MARKER EVENT occurs: every 1% of VOD (with lower bound of 1,000 ms and upper bound of 10,000 ms), every 10,000 ms for live. MARKER EVENTS can be used to estimate when user engagement ends in the event a STOP EVENT is not received.] event sequence number, event type ("marker"), UTC time, percentage (though VOD asset) |
| SEEK EVENT | event sequence number, event type ("seek"), starting time, seek time, UTC time of seek |
| PAUSE EVENT | event sequence number, event type ("pause"), pause time, UTC time of pause |
| RESUME EVENT | event sequence number, event type ("resume"), resume time, UTC time of resume |
| STOP EVENT | event sequence number, event type ("stop"), stop time, UTC time of stop |
| COMPLETE EVENT | event sequence number, event type ("complete"), complete time, UTC time of complete |
| BUFFER-START EVENT | event sequence number, event type ("buffstart"), playhead time that buffering started, UTC time buffering started |
| BUFFER-END EVENT | event sequence number, event type ("buffend"), playhead time that buffering ended, UTC time buffering ended |
| VOLUME EVENT | event sequence number, event type ("volume"), resume time, UTC time of seek, volume value, is muted? |
| SIZE EVENT | event sequence number, event type ("size"), resume time, UTC time of seek, height, width, isfullscreen? |
| VISIBLE EVENT | event sequence number, event type ("visible"), resume time, UTC time of seek, isplayervisible? |

TABLE 1-continued

| Analytics Event/Data Type | Header or Payload Fields |
|---|---|
| ERROR EVENT | event sequence number, event type ("error"), playhead time that error occurred, UTC time that error occurred, error level (warning = 1, error = 2, fatal = 3), message string |
| ABR_DEBUG EVENT | event sequence number, event type ("abrDebug"), ABR engine in manual mode?, decision (up, down, keep, undecided), bitrates (comma-separated list), current bitrate, next higher bitrate, next lower bitrate, throughput, weighted throughput, frames per second (fps) desired, highest dropped fps (current bitrate), highest dropped fps (higher bitrate) maximum desired dropped fps ratio, dropped fps time window, buffer fullness, minimum desired buffer fullness |

Table 1 thus illustrates examples of client-side analytics that a media player application may be preconfigured (e.g., programmed) to capture. Alternatively, or in addition, the techniques of the present disclosure may enable a media player application to capture custom client-side analytics. For example, custom analytics definitions may be provided to a media player application at runtime and/or at design time, as further described with reference to FIG. 6. The present disclosure may thus enable individual streaming service providers, streaming server owners, CDNs, etc. to define custom analytics to be determined by client devices and to be made available for reporting.

Figure 6A:
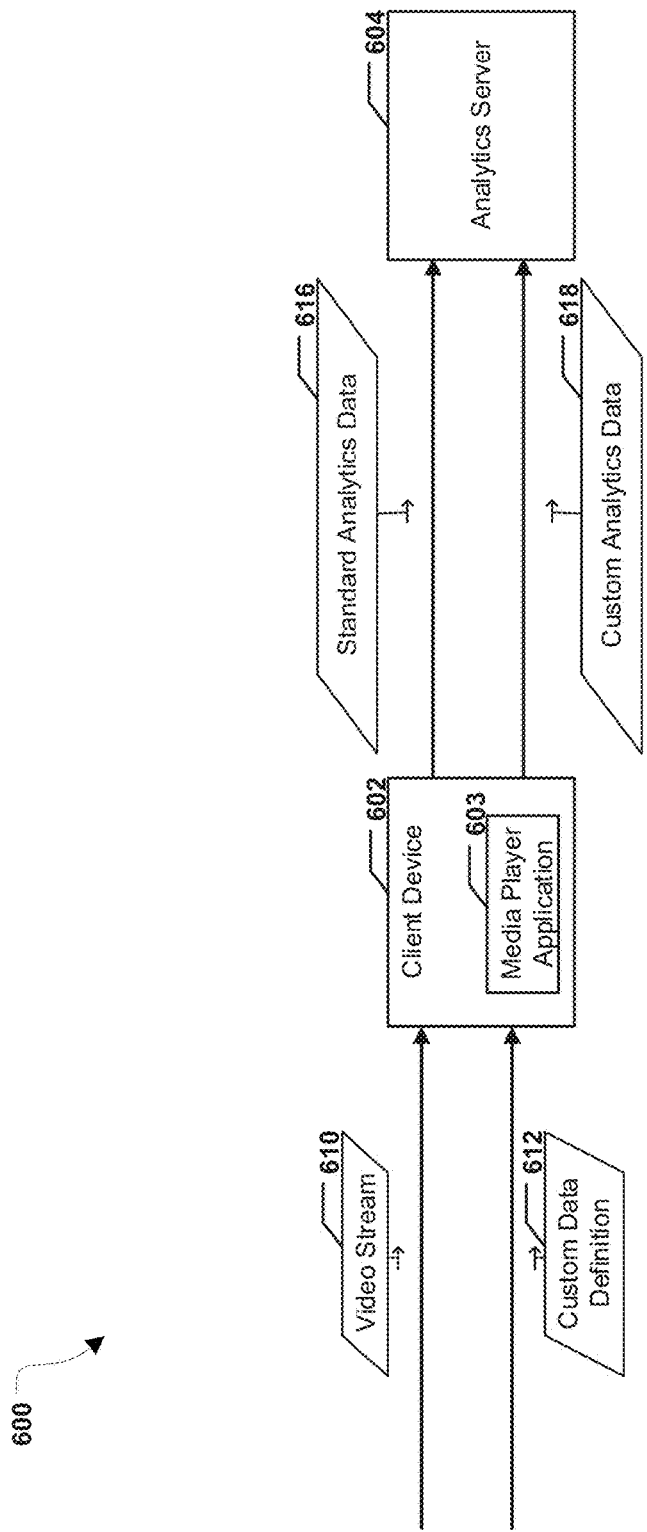
FIGS. 6A and 6B are diagrams illustrating example embodiments of defining custom client device analytics.

Referring to FIG. 6A, a system 600 that supports definitions of custom player statistics/events at runtime is shown. The system 600 includes a client device 602 and an analytics server 604. The client device 602 may correspond to the client device 110 of FIG. 1, the first client 402, the second client 406 of FIG. 4, or a combination thereof. The analytics server 604 may correspond to the analytics server 130 of FIG. 1, the computing device 408, the first analytics server 410, the second analytics server 412, the third analytics server 414, the fourth analytics server 416 of FIG. 4, or a combination thereof. The client device 602 may execute a media player application 603. The media player application 603 may correspond to the media player application 114 of FIG. 1.

The media player application 603 may be configured to generate "standard" player analytics data 616, including but not limited to the analytics data illustrated in Table 1 above. For example, the media player application 603 may include a player analytics module (e.g., the player analytics module 116) that is configured to generate statistics and/or log events based on one or more standard or default definitions of events and/or statistics. The media player application 603 may be configured to cause the client device 602 to transmit the standard analytics data 616 to the analytics server 604.

The media player application 603 may also support a custom data definition 612. The custom data definition 612 may define an event or statistic for the media player application 603 to monitor that is not included in the standard definitions. To illustrate, the custom data definitions 612 may define a user interaction with the media player application 603 not defined by the standard definitions. In another example, the custom data definition 612 may define a user interaction with a social media application or website that is not defined by the standard definitions. In another example, the custom data definition 612 may define statistics associated with the client device 602, such as hardware performance statistics that are not defined by the standard definition.

It is to be understood that FIG. 6A represents various examples of providing custom analytics definitions to the media player application 603. In one example, the client device 602 may "receive" the custom data definition 612 as part of a web page that is configured to cause the client device 602 to launch the media player application 603. For example, the custom data definition 612 may be included in a script embedded in the web page. The script may be configured to cause the client device 602 to launch the media player application 603, and information regarding custom analytics definitions (e.g., the custom data definition 612) may be passed to the media player application 603 via an application programming interface (API) supported by the media player application 603. Alternatively, the custom data definition 612 may be received by the client device 602 during execution of the media player application 603 and may be provided to the media player application 603 via an API. Thus, an API call to provide information regarding custom analytics definitions may be made from code that is executing at the client device 602 alongside the media player application 603 or may be a call that is external to the media player application 603. The media player application 603 may generate custom analytics data 618 based on the custom data definition 612. The custom analytics data 618 may correspond to the client report 160, the client analytics data 161 of FIG. 1, the first analytics data 420, the second analytics data 430 of FIG. 4, or a combination thereof. Thus, the custom analytics data 618 may include one or more timestamps, one or more server IDs, one or more session IDs, a client ID, metadata/tags, or a combination thereof.

In some examples, media player application 603 collects custom analytics data in response to detecting a specific event or in response to detecting that a particular statistic has a particular value or satisfies a particular threshold. The media player application 603 may communicate analytics data (e.g., the standard analytics data 616 and the custom analytics data 618) via an API call. For example, a "postAnalyticsEvent" call may be used to post (e.g., via a HTTP POST command) a time-based event to the analytics server 604.

Figure 6B:
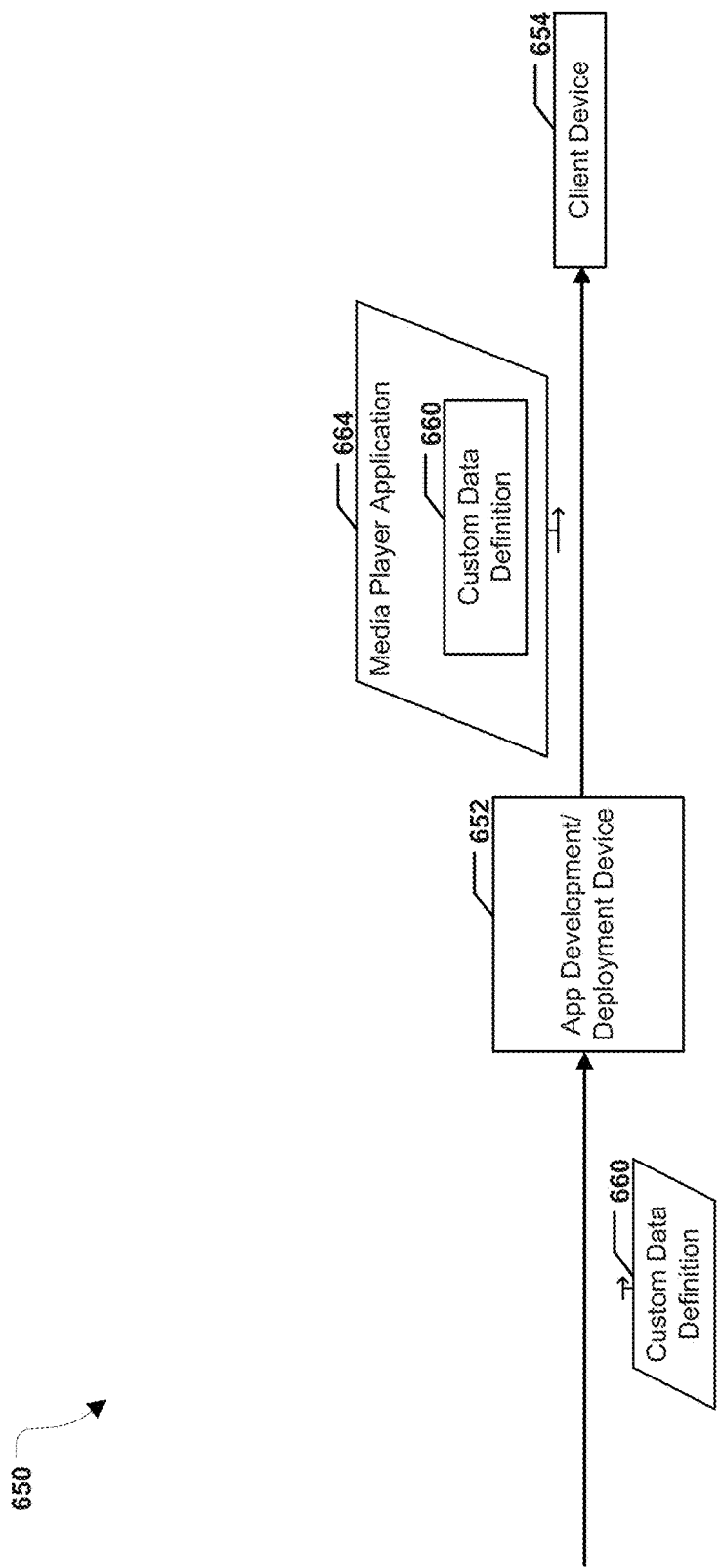

Whereas FIG. 6A illustrates an example of providing a custom data definition to the media player application 603 at runtime after the media player application 603 is installed on the client device 602, FIG. 6B illustrates an alternative embodiment of a system 650 in which definitions of custom player statistics/events are added to a media player application at design time before the media player application is deployed to a client device.

The system 650 includes a client device 654 and an application development/deployment device 652. The client device 654 may correspond to the client device 110 of FIG. 1, the first client 402, the second client 406 of FIG. 4, or a combination thereof. The application development/deployment device 652 may include one or more network interfaces, one or more processors, and one or more memory devices (not shown). The application development/deployment device 652 may be configured to compile, link, and/or distribute (e.g., via download, via an application storefront, etc.) a media player application 664 to the client device 654 (and additional client devices). The media player application 664 may correspond to the media player application 114 of FIG. 1. The media player application 664 may include a plurality of standard definitions of events and/or statistics that the media player application 664 is to monitor and report (e.g., to an analytics server). For example, the media player application 664 may be preconfigured to capture analytics including but not limited to those illustrated in FIG. 1 above.

The application development/deployment device 652 may also support defining custom analytics events/statistics. For example, the application development/deployment device 652 may receive a custom data definition 660 and may incorporate the custom data definition 660 in the media player application 664 (e.g., in an executable file or installation package corresponding to the media player application 664). The custom data definition 660 may define an event or statistic for the media player application 664 to monitor that is not included in the standard definitions, as described with reference to the custom data definition 612 of FIG. 6A.

The media player application 664 may be installed at the client device 654. During execution, the media player application 664 may generate custom analytics data based on the custom data definition 660. The custom analytics data may correspond to the client report 160, the client analytics data 161, the first analytics data 420, the second analytics data 430, or a combination thereof. Thus, the custom analytics data may include one or more timestamps, one or more server IDs, one or more session IDs, a client ID, metadata/tags, or a combination thereof.

In some examples, the custom data definitions 612, 660 of FIGS. 6A-6B may be received from a device associated with a customer of a streaming service, such as an entity that distributes media streams and media players through a streaming service. Accordingly, an individual customer of the streaming service may define custom data to be monitored for by a general purpose media player distributed by the streaming service. FIGS. 6A and 6B thus illustrate runtime and design time examples implementing custom analytics, such as by using API that enables custom code bundled into a "standard" media player software development kit (SDK) to post custom data into an analytics server data stream. The API may enable individual streaming service providers or customers to define their own desired analytics data that is to be collected by media player applications (in addition to any default analytics data that are predefined by a vendor of the media player applications). Examples of custom data include, but are not limited to, fine-grained user engagement data, closed captions or other timed metadata associated with a media stream (e.g., an illustrative video stream 610 in FIG. 6A), data generated by custom modules/plug-ins of a media player application, data associated with social networking feeds or websites, user interactions with user interface elements outside a media player application, etc. In particular embodiments, a custom data definition or a request to add specific hierarchical or non-hierarchical metadata/tags is communicated using an API of a media player, such as a JavaScript® or ActionScript® API (JavaScript is a registered trademarks of Oracle America, Inc. of Redwood Shores, Calif.; ActionScript is a registered trademark of Adobe Systems Incorporated of San Jose, Calif.). In some examples, the custom analytics data described with reference to FIGS. 6A and 6B are associated with custom metadata and/or tags, so that the custom analytics data can be classified and displayed accordingly, as further described with reference to FIGS. 7A and 7B.

Figure 7A:
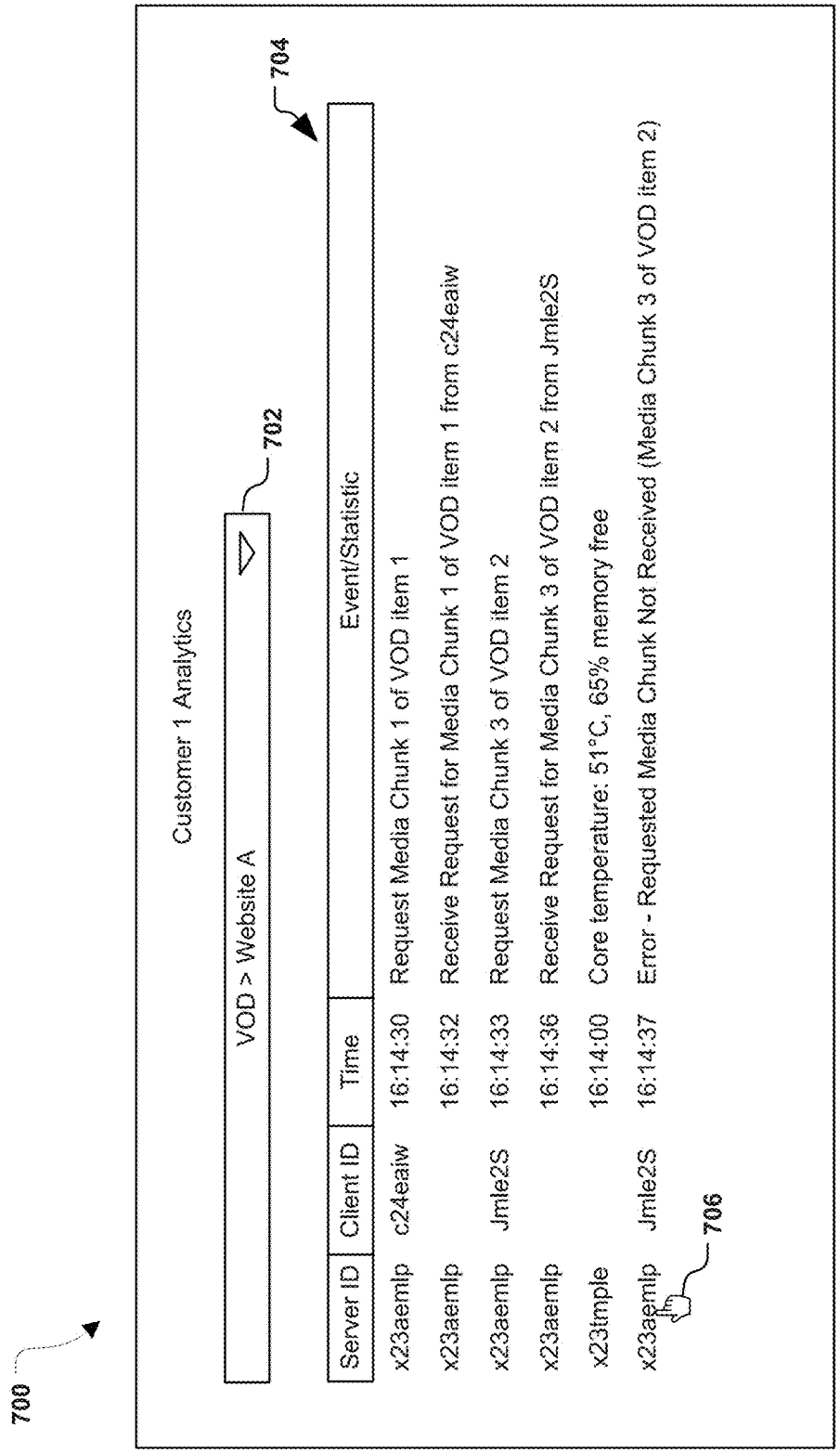

Referring to FIG. 7A, a diagram illustrating a graphical user interface (GUI) 700 that may be output by an analytics server (e.g., the analytics server 130 of FIG. 1 or one of the analytics servers 410-416 of FIG. 4) is shown. The GUI 700 may be output, for example via a web interface, to another computing device. The GUI 700 may correspond to (e.g., may display data related to) a particular customer of a streaming service. In the illustrated example, the GUI 700 corresponds to "Customer 1." In particular examples, the customer may access the GUI 700 from a computing device by providing credentials (e.g., a username, a password, etc.) to the analytics server (e.g., via the web interface). In response to the credentials, the analytics server may output the GUI 700 to the computing device. The GUI 700 may further be configured to transmit user input to the analytics server (e.g., via the web interface) and to display data received based on the user input, as further described herein.

To illustrate, the GUI 700 includes a selection element 702. In the illustrated example, the selection element 702 corresponds to a drop down box, but other types of GUI elements may be used in alternative embodiments. In some examples, the selection element 702 corresponds to a plurality of GUI elements (e.g., drop down boxes, radio buttons, text boxes, other GUI elements, or a combination thereof). The selection element 702 may enable a user to select a particular type of data. The selectable types of data may be classified by hierarchical metadata tags, non-hierarchical metadata tags, metadata tags corresponding to custom data definitions, or a combination thereof, as described with reference to FIGS. 5-6. In particular examples, the selection element 702 may enable the user to input queries based on relational operators (e.g., union, intersection, etc.) between types of data. For example, the selection element 702 may enable selection of the intersection of data tagged by a particular hierarchical metadata tag and a particular metadata tag associated with a custom data definition. In particular examples, the selection element 702 may enable selection of one or more streaming servers, media player applications, client devices, or a combination thereof. Thus, a user may utilize the GUI 700 to, for example, view analytics data collected based on streams from a particular streaming server, a particular version of a media player application, a particular client device, etc. In the embodiment of FIG. 7A, the GUI 700 is displaying analytics data collected based on streaming of VOD content on Website A of Customer 1 (e.g., corresponding to the node 510 in the hierarchical classification of FIG. 5).

The GUI 700 further includes a display area 704. The display area 704 may be configured to display analytics data received from the analytics server based on a selection input via the selection element 702. The analytics data displayed in the display area 704 may include analytics data received from one or more client devices, analytics data received from one or more streaming servers, correlated client-server analytics data as described with reference to FIG. 1, hierarchically classified analytics data as described with reference to FIG. 5, custom analytics data as described with reference to FIGS. 6A and 6B, or any combination thereof. Each data item (e.g., event or statistic) may include a server ID because, as described above with reference to FIG. 1, both client data and server data may include a server ID. Client data displayed in the display area 704 may further include a client ID. In some examples, although not shown in FIG. 7A, client data and/or server data may include a session ID, as described with reference to FIG. 4.

Thus, the GUI 700 may enable a user to identify events and statistics that occur at both client devices and streaming servers that are streaming to those client devices, and how the statistics are related. For example, if the GUI 700 indicates that a client device experienced streaming errors at a particular point in time, the user may use the GUI 700 to view other substantially contemporaneous analytics data and check whether other client devices experienced similar errors, whether conditions at the streaming server may be the reason for the client-side errors, etc. To illustrate, the user may select a portion of the GUI 700, such as the server ID "x23aemlp", as shown at 706. In response, the user may be presented with another GUI, such as an illustrative GUI 750 of FIG. 7B, listing various events collected for the server corresponding to the server ID x23aemlp. Thus, selecting the server ID "x23aemlp" in the GUI 700 may enable the user to "drill-down" on the server and view other analytics for the server that may not be included in the GUI 700. In the example of FIG. 7B, the GUI 750 shows events associated with the server ID x23aemlp that are not limited to VOD items on website A. Based on this information, the user may conclude that the streaming server was overloaded and may take remedial steps to decrease the likelihood of such errors occurring in the future. It is to be understood that the embodiment of FIGS. 7A and 7B is not to be considered limiting. In alternative embodiments, the user may select a different portion of the GUI 700 (or a different GUI) to view "drill-down" information related to a client ID, a session ID, a particular time, a type of event/statistic/error, etc.

In a particular example, the display area 704 may include a "roll-up" of data about clients connected to a streaming server. For example, the display area 704 may indicate a total number of active sessions supported by the streaming server, an average viewing time of clients communicating with the streaming server, a graph of when clients joined and left one or more media streams output by the streaming server, a timeline of events recorded at the media server, viewership broken up by geography or other demographics, a timeline including errors, ABR renditions supported by the streaming server, or a combination thereof.

As another example, the user may use the GUI 700 to compare different hierarchical sets of data (e.g., VOD vs. Live video on Website A, Website A vs. Website B, paying client devices vs. free-to-stream client devices, streaming via CDN 1 vs. streaming via CDN 2, etc.). It should be noted although the GUI 700 of FIG. 7A and the GUI 750 of FIG. 7B illustrate reporting of analytics data in a tabular format, in alternative embodiments, analytics data may be reported in other formats, such as using visual charts, interactive graphics, etc.

Figure 8:
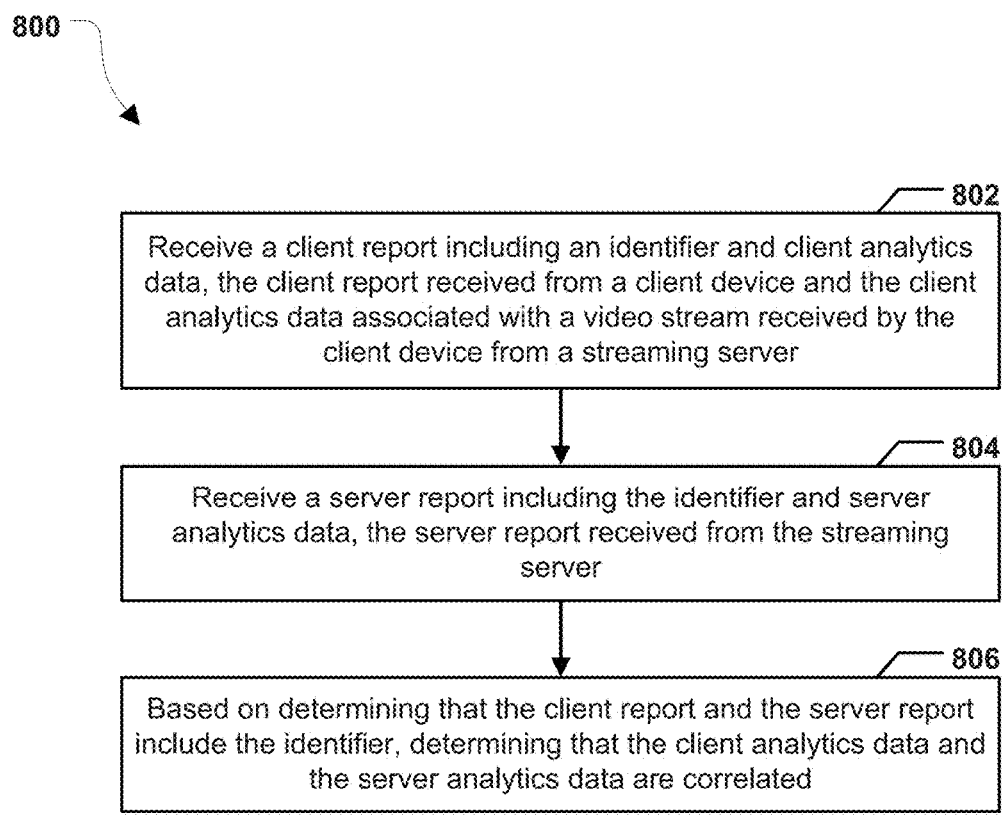
FIG. 8 is a flowchart illustrating a particular embodiment of a method of operation at an analytics server.

Referring to FIG. 8, a flowchart illustrating an example of a method 800 of coordinating analytics between a media player and a server is shown. The method 800 may be performed, for example, by the analytics server 130 of FIG. 1 or one of the analytics servers 410-416 of FIG. 4.

The method 800 may include receiving a client report, at 802. The client report may include an identifier and client analytics data. The client report may be received from a client device and the client analytics data may be associated with a media stream received by the client device from a streaming server. For example, the analytics server 130 may receive the client report 160 from the client device 110 of FIG. 1. The client report 160 may include the server ID 153 of the streaming server 120 and the client analytics data 161.

The client analytics data 161 may be associated with the client device 110 streaming video from the streaming server 120. For example, the client analytics data 161 may report user engagement with a media stream, hardware performance of the client device 110 while receiving the media stream, user interaction with another application or website while receiving the media stream, a location of the client device while receiving the media stream, etc.

The method 800 may also include receiving a server report, at 804. The server report may include the identifier and server analytics data. The server report may be received from the streaming server. For example, the analytics server 130 may receive the server report 170 from the streaming server 120 of FIG. 1. The server report 170 may include the server ID 153 and the server analytics data 171. The server analytics data 171 may report statistics and/or events detected by the streaming server 120.

The method 800 may further include, based on determining that the client report and the server report include the identifier, determining that the analytics data and the server analytics data are correlated, at 806. For example, the correlated analysis module 136 may determine that both the client report 160 and the server report 170 include the server ID 153. Accordingly, the correlated analysis module 136 may correlate the client analytics data 161 with the server analytics data 171. In particular examples, the analytics server may generate the analysis results/commands 182, 184 based on the correlation of the client analytics data 161 and the server analytics data 171, as described with reference to FIG. 1.

The method 800 may improve functioning of a computer system, such as the system 100, by enabling a server (e.g., the analytics server 130) to control a client and/or a server based on synchronized analytics received from a server and a client. For example, such synchronized analytics may enable the analytics server to determine that an event or action at the client may be affecting the server in a particular way or vice versa. Accordingly, the analytics server may issue one or more commands to the server or the client to decrease or increase a particular effect of actions of the server on the client or vice versa. In addition or in the alternative, the synchronized analytics may be output (e.g., via a web interface or GUI, as described with reference to FIG. 7) to facilitate understanding client and server usage and behavior.

Figure 9:
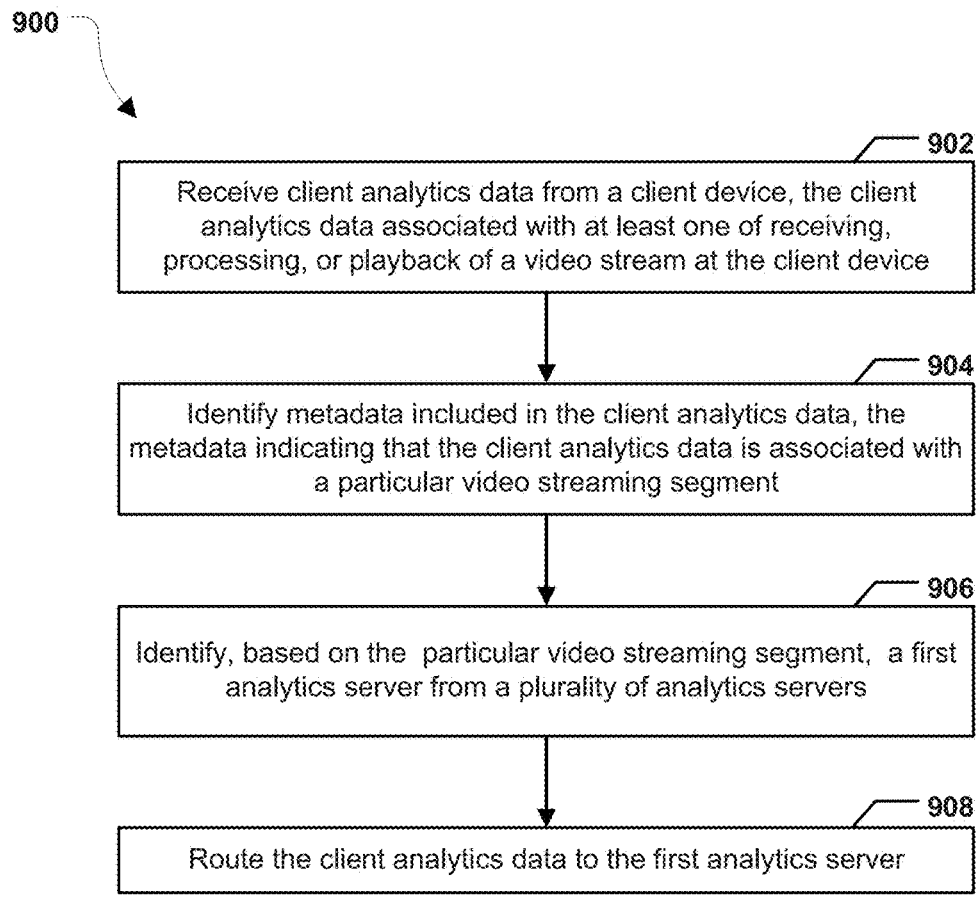
FIG. 9 is a flowchart illustrating a particular embodiment of a method of distributing analytics data.

Referring to FIG. 9, a flowchart illustrating a method 900 of routing analytics data is shown. The method 900 may be performed by a computing device, such as the computing device 408 of FIG. 4.

The method 900 may include receiving client analytics data from a client device, at 902. The client analytics data may be associated with at least one of receiving, processing, or playback of a media stream at the client device. For example, the computing device 408 may receive the first analytics data 420 of FIG. 4. The first analytics data 420 may be associated with an event and/or statistics detected at the first client 402 and associated with the video stream 440.

The method 900 may also include identifying metadata included in the client analytics data, at 904. The metadata may indicate that the client analytics data is associated with a particular category of data. For example, the computing device 408 may identify the metadata 422 included in the first analytics data 420. The metadata 422 may label or tag the first analytics data 420. In particular examples, the metadata 422 may identify a category (e.g., a hierarchical category) to which the first analytics data 420 belongs, as described with reference to FIG. 5.

The method 900 may further include identifying, based on the particular category, a first analytics server from a plurality of analytics servers, at 906. For example, the computing device 408 may identify the second analytics server 412 as being associated with the streaming segment identified by the metadata 422. The method 900 may include routing the client analytics data to the first analytics server, at 908. For example, the computing device 408 may route the first analytics data 420 to the second analytics server 412.

The method 900 may improve functioning of a computer system, such as the system 400, by enabling a device (e.g., the computing device 408) to route analytics data to particular analytics servers. Accordingly, demand on any one analytics server may be reduced and results from any particular analytics server may be obtained more quickly.

Figure 10:
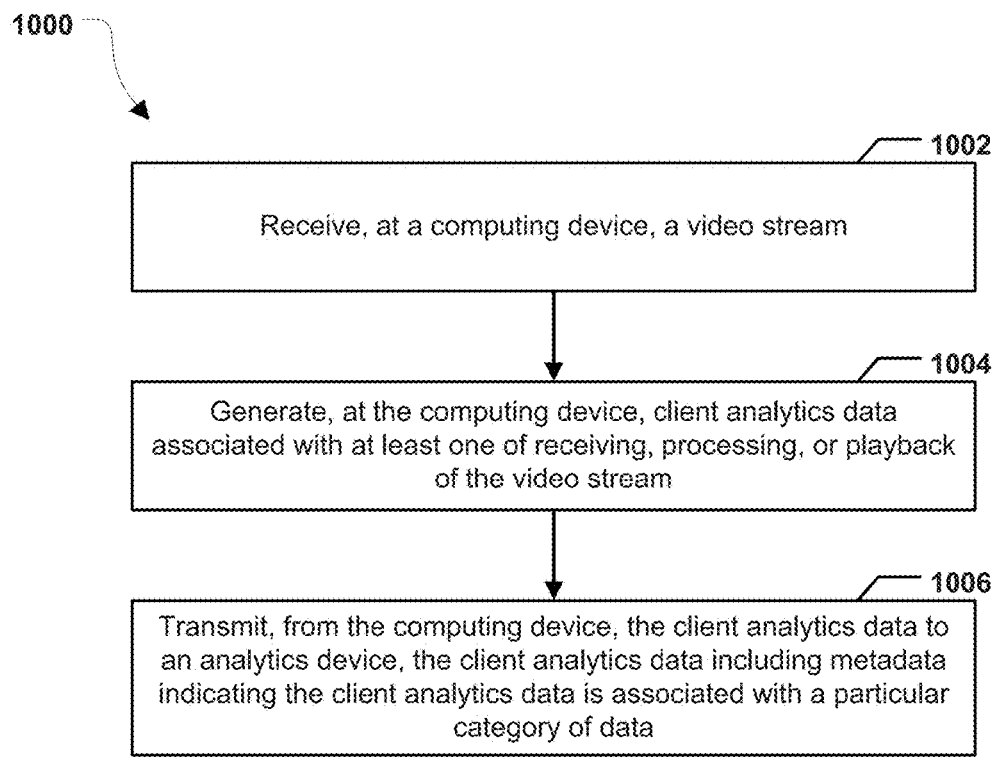
FIG. 10 is a flowchart illustrating a particular embodiment of a method of generating analytics data.

FIG. 10 is a flowchart illustrating a method 1000 of generating analytics data. The method 1000 includes receiving, at a computing device, a media stream, at 1002. For example, the first client 402 may receive the video stream 440.

The method 1000 further includes generating, at the computing device, client analytics data associated with at least one of receiving, processing, or playback of the media stream, at 1004. For example, the first client 402 may generate the first analytics data 420. The first analytics data 420 may be associated with receiving the video stream 440, processing the video stream 440, or playback of the video stream 440.

The method 1000 further includes transmitting, from the computing device, the client analytics data to an analytics device, where the client analytics data includes metadata indicating that the client analytics data is associated with a particular category of data, at 1006. For example, the first client 402 may transmit the first analytics data 420 to the computing device 408 or to one of the analytics servers 410-416. The first analytics data 420 may include the metadata 422. The metadata 422 may identify the first analytics data 420 as belonging to a particular category. In a particular example, the particular category may correspond to a hierarchical category as described with reference to FIG. 5. In other examples, the particular category may not be hierarchical. In some examples, the particular category is determined based on a script included in a web page or in a media player application executing at the first client 402. The script may cause the first client 402 to execute the media player application. The script may include one or more calls to an API supported by the media player application. The API calls may define the particular category (e.g., the particular category may be a "custom" category).

Thus, the method 1000 may be used to generate analytics data that is associated with receipt of a media stream and is tagged with metadata. The metadata may identify a category which may enable an analytics server to more efficiently mine analytics data received from a large number of client devices.

Figure 11:
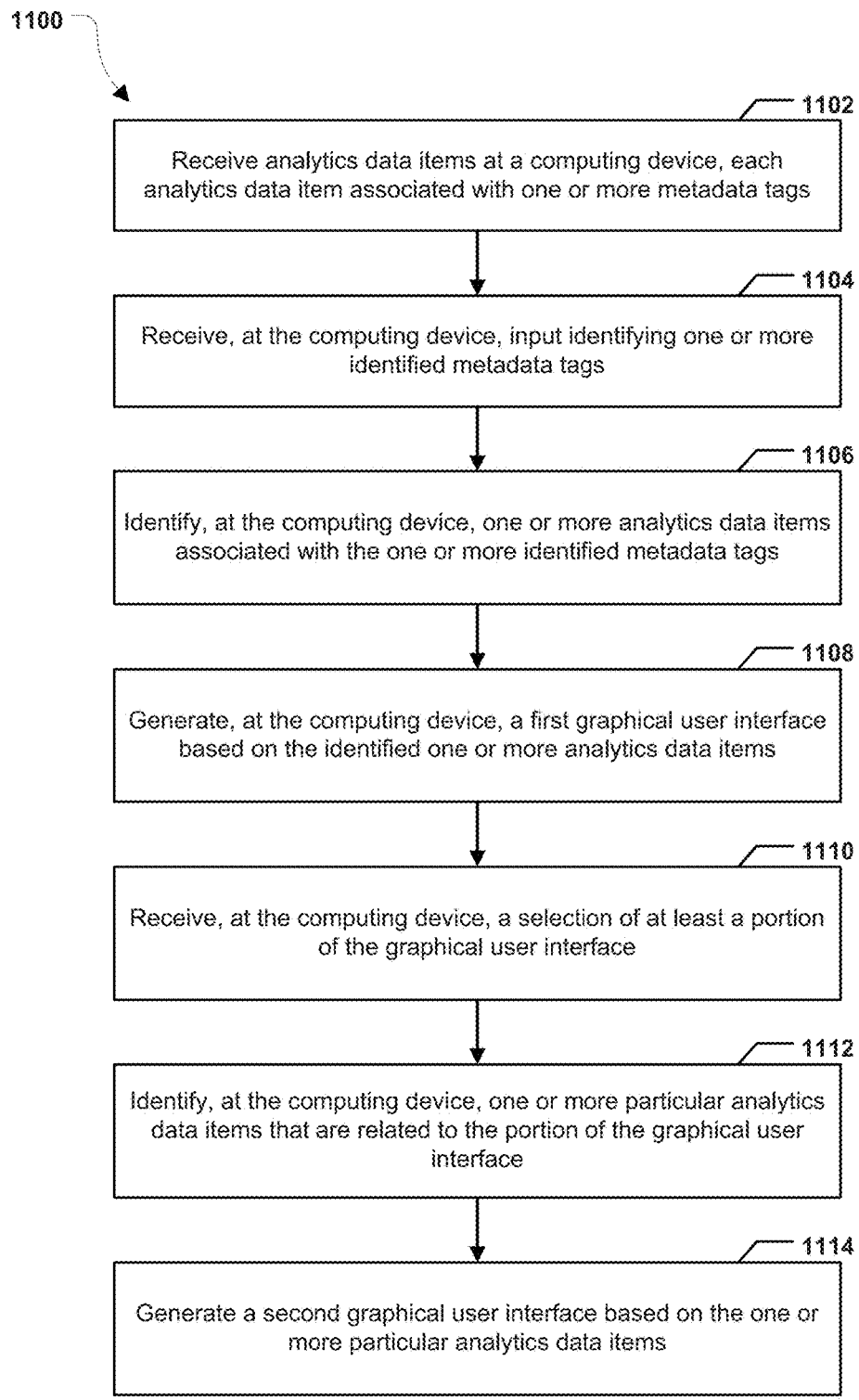
FIG. 11 is a flowchart illustrating a method of displaying analytics data.

Referring to FIG. 11, a method 1100 of displaying analytics data is shown. In particular examples, the method 1100 may be performed by the analytics server 130, the computing device 408, or the analytics servers 410-416. The method 1100 includes receiving analytics data items at a computing device, at 1102. Each analytics data item is associated with one or more metadata tags. For example, the analytics server 130 may receive the client report 160 and the server report 170. As another example, the computing device 408 and/or the analytics servers 410-416 may receive the first analytics data 420 and the second analytics data 430.

The method 1100 further includes receiving, at the computing device, input identifying one or more identified metadata tags, at 1104. For example, the analytics server 130, the computing device 408, or one of the analytics servers 410-416 may receive (e.g., via a web interface) an indication of metadata tags selected via the selection element 702. To illustrate, as shown in FIG. 7A, a user may provide input selecting "VOD" and "Website A" for "Customer 1."

The method 1100 further includes identifying, at the computing device, one or more analytics data items associated with the one or more identified metadata tags, at 1106, and generating a first graphical user interface based on the identified one or more analytics data items. For example, the analytics server 130, the computing device 408, or one or more of the analytics servers 410-416 may generate the display area 704 using analytics data identified using the metadata tags selected via the selection element 702. To illustrate, as shown in FIG. 7A, the GUI 700 may display analytics data corresponding to VOD content streaming on Website A for Customer 1.

The method 1100 further includes receiving, at the computing device, a selection of at least a portion of the GUI, at 1110. For example, the analytics server 130, the computing device 408, or one or more of the analytics servers 410-416 may receive a selection of the server ID x23aemlp, as shown at 706.

The method 1100 further includes identifying one or more particular analytics data items that are related to the portion of the GUI, at 1112, and generating a second graphical user interface based on the one or more particular analytics data items, at 1114. For example, the analytics server 130, the computing device 408, or one or more of the analytics servers 410-416 may generate the second GUI 750 to show all analytics data associated with the selected server ID x23aemlp.

Thus, the method 1100 may be used to display analytics data associated with streaming media. The method 1100 may also enable a user to select a portion of a GUI to "drill-down" on particular analytics data.

Figure 12:
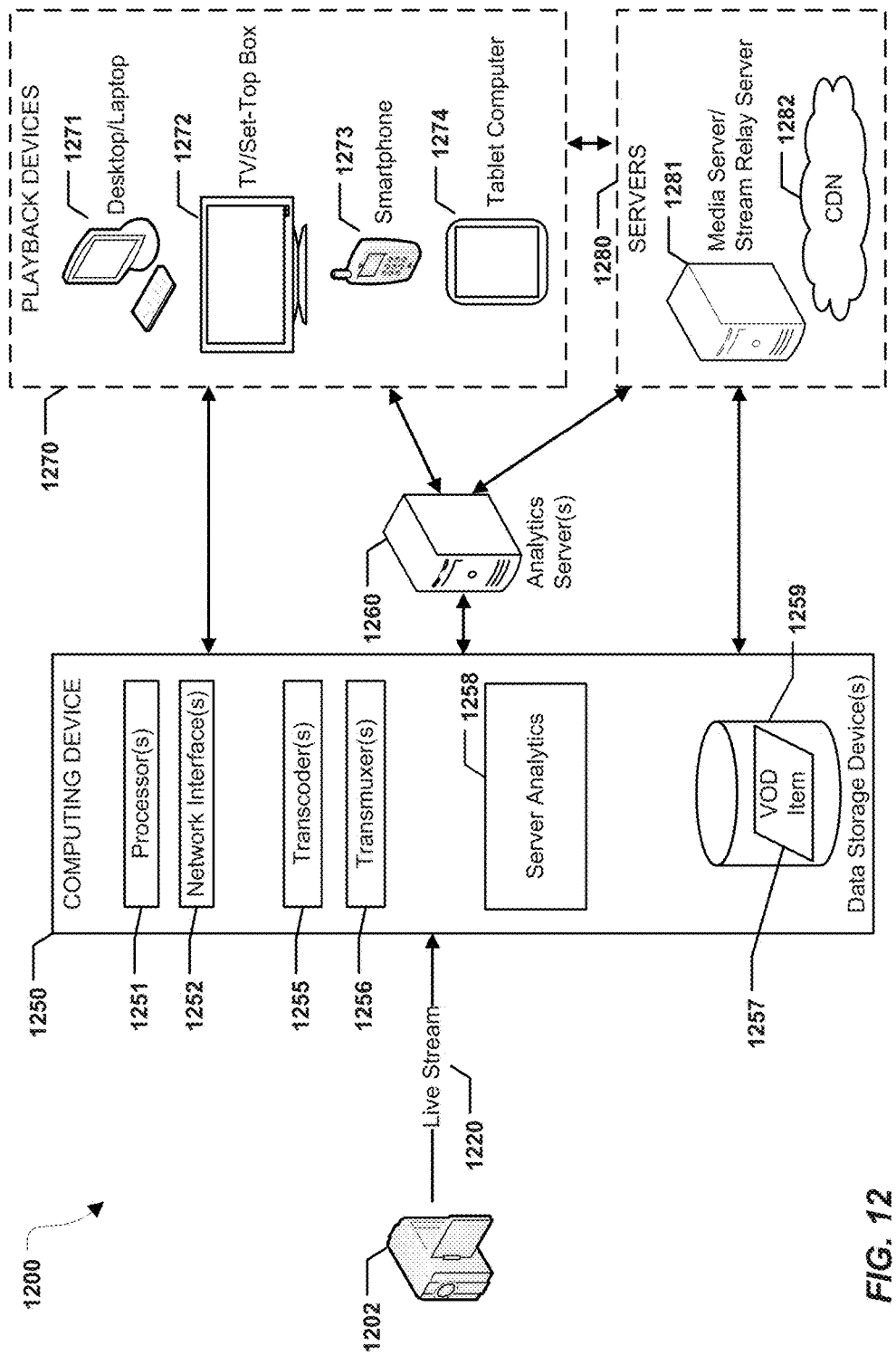
FIG. 12 is a diagram of another particular embodiment of a system that is operable to collect and analyze streaming analytics.

FIG. 12 is a diagram to illustrate another particular embodiment of a system 1200 that is operable to support coordination and distribution of analytics. The system 1200 includes a computing device 1250 that is configured to send data to and receive data from various other devices (e.g., via a network, such as LAN or the Internet). For example, the computing device 1250 may communicate with one or more playback devices 1270 (e.g., devices that are configured to stream video content) and one or more other servers 1280. In an illustrative embodiment, the computing device 1250 may correspond to the streaming server 120 of FIG. 1. In a particular embodiment, each of the playback devices 1270 correspond to the client device 110 and one or more of the servers 1280 correspond to the streaming server 120. It should be noted that the illustrated playback devices 1270 are examples. The playback devices 1270 may include additional client devices and/or other types of devices capable of accessing webpages and/or playing media streams. The system 1200 further includes one or more analytics servers 1260 configured to receive analytics data from the playback devices 1270, the computing device 1250, and the servers 1280.

The computing device 1250 may include one or more processors 1251 and various components that are executable by the processor(s) 1251. The computing device 1250 may correspond to or include software application(s) that perform media serving or processing, hardware systems (e.g., servers) that support or perform media serving and processing, or any combination thereof. Thus, various operations described with reference to the computing device 1250, or components thereof, may be implemented using hardware, software (e.g., instructions executable by the processor(s) 1251), or any combination thereof.

The computing device 1250 may include one or more network interfaces 1252. For example, the network interface(s) 1252 may include input interface(s) and output interface(s) that are configured to receive data and to send data, respectively. In a particular embodiment, the network interface(s) 1252 may be wired and/or wireless interfaces that enable the computing device 1250 to communicate data via a network, such as the Internet. For example, the network interface(s) 1252 may include an Ethernet interface, a wireless interface compatible with an Institute of Electrical and Electronics Engineers (IEEE) 802.11 (e.g., Wi-Fi) protocol, or other wired or wireless interfaces.

The network interface(s) 1252 may be configured to receive one or more media streams, such as an illustrative live media stream 1220 from a capture source 1202 (e.g., a camera) or a computing device that includes or is coupled to the capture source 1202. The live media stream 1220 may include audio data, video data, text data, closed captioning (CC) data, and/or subtitle data, and may correspond to the live stream 124 of FIG. 1. The network interface(s) 1252 may also be configured to transmit data to the one or more playback devices 1270 (e.g., a smartphone, a tablet computer, a laptop computer, a desktop computer, a set-top box, a television, a portable media player, a game console, etc.).

In the embodiment of FIG. 12, the playback devices 1270 include a desktop/laptop computing device 1271, a television (TV)/set-top box/streaming device (such as Roku® or Google Chromecast® (Roku is a registered trademark of Roku, Inc. of Saratoga, Calif. and Google Chromecast is a registered trademark of Google Inc. of Mountain View Calif.)) 1272, a smartphone 1273, and a tablet computer 1274. The network interface(s) 1252 may further be configured to transmit data to the one or more other servers 1280 (e.g., a media server, a stream relay server, a server of a content distribution network (e.g., an edge server), etc.). In the embodiment of FIG. 12, the other servers 1280 include a media server/stream relay server 1281 and a server of a content distribution network (CDN) 1282. In a particular embodiment, data transmitted to the playback devices 1270 and to the servers 1280 includes media streams (e.g., streams including media content, such as audio, video, text, still images, or a combination thereof). The media streams may be associated with the same encoding format and transmission protocol or may be associated with different encoding formats and transmission protocols. In a particular embodiment, generating the media streams includes performing video decoding, encoding, transcoding, and/or transmuxing operations at the computing device 1250 (e.g., to modify a video encoding format, an audio encoding format, a bitrate, an aspect ratio, packaging, etc. relative to the incoming media stream 1220). In a transmuxing operation, encoded audio and video may be repackaged without modifying the encoded audio and video.

The computing device 1250 may include various components configured to perform stream processing functions. For example, the computing device 1250 may include one or more video processing components, such as encoder(s), decoder(s), transcoder(s) 1255, and/or transmuxer(s) 1256, each of which may be implemented using hardware, software, or both. In a particular embodiment, the transcoder(s) 1255 and/or transmuxer(s) 1256 correspond to the transcoder/transmuxer 126 of FIG. 1. For example, the transcoder(s) 955 may be executed by cloud-based virtual machines. The transcoder(s) 1255 may be configured to perform encoding, decoding, bitrate conversion, codec conversion, frame size conversion, etc. Depending on a format of a received stream, a playback format supported by a requesting device, and/or transcoding parameters in use, a transcoding operation performed by the transcoder(s) 1255 may trigger a decoding operation and/or a re-encoding operation. In a particular embodiment, parameters used by the transcoder(s) 1255 are stored in one or more transcoding templates at the computing device 1250. The transcoder(s) 1255 may thus enable the computing device 1250 to process data in accordance with multiple coding technologies and protocols.

As another example, the transmuxer(s) 1256 may be executed by cloud-based virtual machines. The transmuxer(s) 1256 may be configured to repackage video data to conform to an output format/protocol. The transmuxer(s) 1256 may thus enable the computing device 1250 to process data in accordance with multiple coding technologies and protocols.

For example, the computing device 1250 may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The computing device 1250 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The computing device 1250 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The computing device 1250 may also support real time messaging protocol (RTMP) (and variants thereof), real-time streaming protocol (RTSP), real-time transport protocol (RTP), web real-time communication (WebRTC), and MPEG-2 transport stream (MPEG-TS). Additional audio formats, video formats, coder/decoders (codecs), and/or protocols may also be supported.

The computing device 1250 may include one or more data storage devices 1259 (e.g., random access memory (RAM), disk-based storage, etc.). The data storage device(s) 1259 may store stream data (e.g., frames of a live video stream), files, closed caption data, images (e.g., to be overlaid on top of a video stream), and other data. In a particular embodiment, the data storage device(s) 1259 store a video on demand (VOD) item 1257. The VOD item 1257 may include audio data, video data, text data, closed captioning (CC) data, and/or subtitle data. For example, the VOD item 1257 may be a movie or a television show. Alternately, the VOD item 1257 may be stored remote from the computing device 1250 and may be accessible by the computing device 1250 via a network (e.g., the Internet). The VOD item 1257 may correspond to the VOD item 125.

In a particular embodiment, the computing device 1250 may support adaptive streaming. For example, the computing device 1250 may be configured to generate an adaptive streaming master rendition list. The master rendition list may include information describing adaptive bitrate renditions that are available for adaptive streaming. To initiate an adaptive streaming session, a destination device (e.g., one of the playback devices 1270) may request the master rendition list, for example by transmitting a HTTP GET request for the master rendition list. Upon receiving the master rendition list, the destination device may determine which of the available renditions should be requested from the computing device 1250. For example, the destination device may make such a determination based on buffering/processing capability at the destination device and/or network conditions (e.g., bandwidth) being experienced by the destination device.

Upon determining which rendition should be requested, the destination device may transmit a request (e.g., a HTTP GET request) to the computing device 1250. The request may specify a particular rendition chunk list. In response to the request, the computing device 1250 may transmit a rendition chunk list to the destination device. Upon receiving the rendition chunk list, the destination device may determine a particular portion (e.g., portion "X") of the requested rendition to request. The particular portion may correspond to one or more media chunks. A media "chunk" may refer to a fixed length duration (e.g., ten seconds) portion or to a variable length duration portion of a stream rendition. The particular portion may be specified using start/end frame numbers, start/end times, a portion number/identifier, etc. The destination device may transmit a request (e.g., a HTTP GET request) to the computing device 1250 identifying the particular portion. In response to the request identifying the particular portion, the computing device 1250 may transmit the particular portion to the destination device. Depending on the adaptive streaming protocol in use, the requested portion may correspond to a "chunk" of a rendition and/or a group of pictures (GOP). A "chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the destination device may request a subsequent portion (e.g., portion "X+1") of the same rendition. However, if playback and/or network conditions become worse, the destination device may switch to a lower bitrate rendition by requesting subsequent portions of the lower bitrate rendition. Conversely, if playback and/or network conditions improve, the destination device may switch to a higher bitrate rendition. The computing device 1250 may generate key frame aligned portions for the adaptive streaming renditions, so that switching to a lower bitrate or higher bitrate rendition appears "seamless" (e.g., does not result in noticeable visual glitches or dropped frames).

The computing device 1250 may also include a server analytics module 1258, which may operate as described with reference to the server analytics module 127 of FIG. 1. During operation, the computing device 1250 may distribute a server ID to the playback devices 1270 that stream from the computing device 1250, such as in a master rendition list (e.g., a manifest, a playlist, etc.) in a rendition chunk list, and/or in media chunks. The computing device 1250 may include the server ID in server reports of server analytics that are sent (e.g., via HTTP POST requests) to the analytics server(s) 1260. The playback devices 1270 that stream from the computing device 1250 may include the server ID in client reports of client analytics sent (e.g., via HTTP POST requests) to the analytics server 1260. In an embodiment where the analytics server(s) 1260 is collocated with a streaming server (e.g., the computing device 1250), first HTTP port(s) may be used to communicate a master rendition list and media chunks and second HTTP port(s) may be used to for communication of analytics data.

The servers 1280 may include other server IDs in server reports sent to the analytics server(s) 1260. The playback devices 1270 that stream from the servers 1280 may include the corresponding server IDs in client reports of client analytics sent to the analytics server(s) 1260. Accordingly, the analytics server(s) 1260 may correlate server and client analytics based on the server IDs. In some embodiments, reports are received by an intermediate device (not shown) and routed to the analytics server(s) 1260 based on metadata included in the reports, as described with reference to FIG. 4. In some embodiments, analytics data received by the analytics server(s) 1260 is categorized and/or tagged with non-hierarchical metadata, as described with reference to FIG. 5. In some embodiments, one or more of the playback devices 1270 is configured to collect and transmit custom analytics data, as described with reference to FIGS. 6A-6B.

It should be noted that the orders of steps described with reference to FIGS. 1-12 are to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the client device 110, the streaming server 120, the analytics server 130 of FIG. 1, the computing device 408, the first client 402, the second client 406, the first analytics server 410, the second analytics server 412, the third analytics server 414, the fourth analytics server 416 of FIG. 4, the client device 602, the analytics server 604 of FIG. 6A, the applicant development/deployment device 652, the client device 654 of FIG. 6B, the computing device 1250, the playback devices 1270, the servers 1280, the analytics server 1260 of FIG. 12, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). In addition to such live feeds, the described systems and methods may also be used in conjunction with "live linear television (TV)" streams. A live linear TV stream may correspond to a VOD asset being rebroadcast as a live feed. It should also be noted that although certain embodiments may be described herein with reference to video on demand, not all of the described techniques may require video content or data. Certain embodiments may also be used on demand content that does not include video (e.g., audio on demand radio or music streams).

In a particular embodiment, a method includes receiving a client report including an identifier and client analytics data, the client report received from a client device and the client analytics data associated with a media stream received by the client device from a streaming server. The method further includes receiving a server report including the identifier and server analytics data, the server report received from the streaming server. The method further includes, based on determining that the client report and the server report include the identifier, determining that the client analytics data and the server analytics data are correlated.

In another particular embodiment, an apparatus includes a network interface to receive a client report including an identifier and client analytics data, the client report received from a client device and the client analytics data associated with a media stream received by the client device from a streaming server. The network interface is further configured to receive a server report including the identifier and server analytics data, the server report received from the streaming server. The apparatus further includes a processor and a memory. The memory stores instructions that, when executed by the processor, cause the processor to perform operations. The operations include, based on determining that the client report and the server report include the identifier, determining that the client analytics data and the server analytics data are correlated.

In another particular embodiment, a computer readable storage device includes instructions that, when executed by a processor, cause the processor to perform operations. The operations include receiving a client report including an identifier and client analytics data, the client report received from a client device and the client analytics data associated with a media stream received by the client device from a streaming server. The operations further include receiving a server report including the identifier and server analytics data, the server report received from the streaming server. The operations further include, based on determining that the client report and the server report include the identifier, determining that the client analytics data and the server analytics data are correlated.

In another particular embodiment, a method includes receiving client analytics data from a client device, the client analytics data associated with at least one of receiving, processing, or playback of a media stream at the client device. The method further includes identifying metadata included in the client analytics data, the metadata indicating that the client analytics data is associated with a particular category of data. The method further includes identifying, based on the particular category, a first analytics server from a plurality of analytics servers. The method further includes routing the client analytics data to the first analytics server. In some examples, the method may also include generating a GUI displaying at least a portion of the client analytics data. Such a GUI may, for example, enable analysis of the client analytics data based on the metadata.

In another particular embodiment, an apparatus includes a network interface configured to receive client analytics data from a client device, the client analytics associated with at least one of receiving, processing, or playback of a media stream at the client device. The apparatus further includes a processor and a memory. The memory stores instructions that, when executed by the processor, cause the processor to perform operations. The operations include identifying metadata included in the client analytics data, the metadata indicating that the client analytics data is associated with a particular category of data. The operations further include identifying, based on the particular category, a first analytics server from a plurality of analytics servers. The operations further include initiating transmission of the client analytics data to the first analytics server. In some examples, the operations may also include generating a GUI displaying at least a portion the client analytics data. Such a GUI may, for example, enable analysis of the client analytics data based on the metadata.

In another particular embodiment, a method includes receiving, at a computing device, a media stream. The method further includes generating, at the computing device, client analytics data associated with at least one of receiving, processing, or playback of the media stream. The method further includes transmitting, from the computing device, the client analytics data to an analytics device, the client analytics data including metadata indicating that the client analytics data is associated with a particular category of data.

In another particular embodiment, an apparatus includes a network interface configured to receive, at a computing device, a media stream. The apparatus further includes a processor and a memory. The memory stores instructions that, when executed by the processor, cause the processor to perform operations. The operations include generating, at the computing device, client analytics data associated with at least one of receiving, processing, or playback of the media stream. The operations further include initiating transmission, from the computing device, of the client analytics data to an analytics device, the client analytics data including metadata indicating that the client analytics data is associated with a particular category of data.

In another particular embodiment, a computer readable storage device includes instructions that, when executed by a processor, cause the processor to perform operations. The operations include receiving, at a computing device, a media stream. The operations further include generating, at the computing device, client analytics data associated with at least one of receiving, processing, or playback of the media stream. The operations further include initiating transmission, from the computing device, of the client analytics data to an analytics device, the client analytics data including metadata indicating that the client analytics data is associated with a particular category of data.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a client device, a media stream from a media server;
   generating, at the client device, client analytics data associated with at least one of receiving, processing, or playback of the media stream;
   initiating transmission, from the client device, of the client analytics data to an analytics device, the analytics device comprising a separate device than the media server, the client analytics data including a media server identifier and metadata indicating that the client analytics data is associated with a particular category of data, wherein the media server identifier uniquely identifies the media server, wherein the particular category is part of a first level of a hierarchy, and wherein the media server identifier is associated with a second level of the hierarchy;
   receiving, at the client device, a command requesting additional client analytics data based on the media server identifier, the command correlated to a performance characteristic of the media server;
   generating the additional client analytics data; and
   initiating transmission, at the client device, of the additional client analytics data to the analytics device, wherein initiating transmission of the additional client analytics data is based on the second level of the hierarchy.

2. The method of claim 1, further comprising adjusting the at least one of the receiving, the processing, or the playback of the media stream based on the command.

3. The method of claim 1, wherein the metadata includes a plurality of tags, and wherein the analytics device analyzes the client analytics data based on categories identified by the plurality of tags.

4. The method of claim 1, wherein the client analytics data is generated in response to a definition included in a script, the script included in a web page and associated with launching a media player application at the client device.

5. The method of claim 4, wherein the definition includes one or more calls to an application programming interface (API) supported by the media player application.

6. The method of claim 1, wherein the client analytics data is generated based on a definition included in a media player application prior to runtime of the media player application, and further comprising determining a temporal correlation between the client analytics data and server analytics data based on a clock synchronization procedure performed between the client device and the media server during setup of a streaming session between the client device and the media server.

7. The method of claim 1, further comprising:
   receiving, at the analytics device from the media server, server analytics data comprising one or more performance characteristics of the media server and including the media server identifier of the media server;
   receiving, at the analytics device from the client device, the client analytics data associated with at least one of receiving, processing, or playback of the media stream, the client analytics data including the media server identifier to indicate that the media server transmitted the media stream to the client device and metadata indicating that the client analytics data is associated with a particular category of data; and
   based on the media server identifier, correlating the client analytics data and the server analytics data.

8. The method of claim 7, wherein the metadata includes a plurality of tags.

9. The method of claim 8, further comprising analyzing the client analytics data based on categories identified by the plurality of tags.

10. The method of claim 7, further comprising generating a graphical user interface (GUI) based on the client analytics data.

11. The method of claim 7, further comprising:
transmitting the command to the client device;
receiving the additional client analytics data from the client device, the additional client analytics data associated with at least one of receiving, processing, or playback of the media stream and including the media server identifier; and
based on the media server identifier, correlating the additional client analytics data with the client analytics data, the server analytics data, or a combination thereof.

12. The method of claim 11, further comprising:
receiving, from a second client device, second client analytics data associated with at least one of receiving, processing, or playback of the media stream and including the media server identifier; and
based on the media server identifier, correlating the second client analytics data with the client analytics data, the server analytics data, or a combination thereof.

13. The method of claim 12, further comprising:
receiving, from a second media server, second server analytics data comprising one or more performance characteristics of the second media server and including a second media server identifier uniquely identifying the second media server;
receiving, from a third client device, third client analytics data associated with at least one of receiving, processing, or playback of a second media stream and including the second media server identifier; and
based on the second media server identifier, correlating the second server analytics data with the third client analytics data.

14. The method of claim 7, further comprising periodically receiving the additional client analytics data from the client device.

* * * * *